United States Patent
Wu et al.

(10) Patent No.: US 11,470,058 B2
(45) Date of Patent: Oct. 11, 2022

(54) NETWORK CONNECTION METHOD, MOBILE TERMINAL, ELECTRONIC DEVICE, AND GRAPHICAL USER INTERFACE

(71) Applicant: Huawei Technologies Co., Ltd., Shenzhen (CN)

(72) Inventors: Fei Wu, Shenzhen (CN); Qizhi Zhan, Shenzhen (CN); Tao Sun, Shenzhen (CN); Ke Zhang, Shenzhen (CN); Ruijie Xiao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 618 days.

(21) Appl. No.: 16/490,830

(22) PCT Filed: Jun. 21, 2017

(86) PCT No.: PCT/CN2017/089418
§ 371 (c)(1),
(2) Date: Sep. 3, 2019

(87) PCT Pub. No.: WO2018/157512
PCT Pub. Date: Sep. 7, 2018

(65) Prior Publication Data
US 2020/0008056 A1    Jan. 2, 2020

(30) Foreign Application Priority Data

Mar. 3, 2017   (CN) .......................... 201710125084.5
Apr. 28, 2017   (WO) ................ PCT/CN2017/082608

(51) Int. Cl.
*H04L 29/06*    (2006.01)
*H04L 9/40*    (2022.01)
(Continued)

(52) U.S. Cl.
CPC ........ *H04L 63/0435* (2013.01); *H04L 9/0838* (2013.01); *H04W 12/0431* (2021.01);
(Continued)

(58) Field of Classification Search
None
See application file for complete search history.

(56) References Cited

U.S. PATENT DOCUMENTS 7,929,498 B2 *   4/2011   Ozluturk ............... G06F 13/374
                                                                370/335
9,261,289 B2    2/2016   Ruff et al.
(Continued)

FOREIGN PATENT DOCUMENTS

CN      101355802 A    1/2009
CN      101808323 A    8/2010
(Continued)

OTHER PUBLICATIONS

Chen, Tao et al. Improving the Efficiency of Localization-Oriented Network Adjustment in Wireless Sensor Networks. IEEE Communications Letters, vol. 15, Issue 9. https://ieeexplore.ieee.org/stamp/stamp.jsp?tp=&arnumber=5997337 (Year: 2011).*
(Continued)

*Primary Examiner* — Jeremiah L Avery
(74) *Attorney, Agent, or Firm* — Conley Rose, P.C.

(57) ABSTRACT

The present disclosure provides a network connection method, a mobile terminal, and an electronic device. The method includes: sending a wireless signal, detecting the wireless signal and indicating that the electronic device is discovered by the electronic device; obtaining a network connection confirm operation and providing a notification to the electronic device by the mobile terminal; decreasing, by the electronic device, a signal transmit power; prompting a user to move closer to the electronic device, indicating a (Continued)

detected signal strength of the electronic device, and sending a wireless network key to the electronic device by the mobile terminal, when a preset condition is met in a process in which the mobile terminal moves closer to the electronic device; and increasing, by the electronic device, the signal transmit power, and connecting to a wireless network. This method and apparatus can be used for artificial intelligence, smart home, Internet of Things, etc.

20 Claims, 15 Drawing Sheets

(51) Int. Cl.
*H04W 76/10* (2018.01)
*H04L 9/08* (2006.01)
*H04W 12/06* (2021.01)
*H04W 52/24* (2009.01)
*H04W 52/36* (2009.01)
*H04W 68/00* (2009.01)
*H04W 12/0431* (2021.01)
*H04W 12/0471* (2021.01)
*H04W 12/64* (2021.01)

(52) U.S. Cl.
CPC ....... *H04W 12/0471* (2021.01); *H04W 12/06* (2013.01); *H04W 12/64* (2021.01); *H04W 52/245* (2013.01); *H04W 52/36* (2013.01); *H04W 68/005* (2013.01); *H04W 76/10* (2018.02); *H04L 2209/80* (2013.01)

(56) References Cited

U.S. PATENT DOCUMENTS

| | | | |
|---|---|---|---|
| 9,444,631 B2 | 9/2016 | Logue | |
| 11,157,954 B1* | 10/2021 | Belanger | G06Q 30/0201 |
| 2003/0050009 A1 | 3/2003 | Kurisko et al. | |
| 2013/0322401 A1* | 12/2013 | Visuri | H04W 48/20 370/331 |
| 2014/0273950 A1 | 9/2014 | Li et al. | |
| 2015/0071139 A1* | 3/2015 | Nix | H04L 9/30 370/311 |
| 2016/0248738 A1 | 8/2016 | Brandsma et al. | |
| 2016/0261601 A1 | 9/2016 | Zhou et al. | |
| 2016/0337327 A1 | 11/2016 | Borean et al. | |
| 2017/0280277 A1 | 9/2017 | Ge et al. | |
| 2017/0311290 A1* | 10/2017 | Adjakple | H04W 76/18 |
| 2020/0008056 A1* | 1/2020 | Wu | H04W 52/36 |

FOREIGN PATENT DOCUMENTS

| | | |
|---|---|---|
| CN | 102355662 A | 2/2012 |
| CN | 103607714 A | 2/2014 |
| CN | 103781023 A | 5/2014 |
| CN | 104093147 A | 10/2014 |
| CN | 104144415 A | 11/2014 |
| CN | 104735814 A | 6/2015 |
| CN | 105188024 A | 12/2015 |
| CN | 105516896 A | 4/2016 |
| CN | 105592462 A | 5/2016 |
| CN | 105915502 A | 8/2016 |
| CN | 105992390 A | 10/2016 |
| CN | 106105376 A | 11/2016 |
| EP | 2890083 A2 | 7/2015 |
| EP | 3059919 A1 | 8/2016 |
| WO | 2015101382 A1 | 7/2015 |

OTHER PUBLICATIONS

Zhang, De-Gan et al. New Dv-Distance Algorithm Based on Path for Wireless Sensor Network. 2015 IEEE 12th International Conference on Mobile Ad Hoc and Sensor Systems. https://ieeexplore.ieee.org/stamp/stamp.jsp?tp=&arnumber=7366981 (Year: 2015).*
Marian, Salavat; Mircea, Popa. Sybil attack type detection in Wireless Sensor networks based on received signal strength indicator detection scheme. 2015 IEEE 10th Jubilee International Symposium on Applied Computational Intelligence and Informatics, https://ieeexplore.ieee.org/stamp/stamp.jsp?tp=&arnumber=7208183 (Year: 2015).*
IEEE Std 802.15.4 TM—2006(Revision of IEEE Std 802.15.4-2003), IEEE Standard for Information technology—Telecommunications and information exchange between systems—Local and metropolitan area networks—Specific requirements—Part 15.4: Wireless Medium Access Control (MAC) and Physical Layer (PHY) Specifications for Low-Rate Wireless Personal Area Networks (WPANs), Approved Jun. 7, 2006, total 323 pages.
Machine Translation and Abstract of Chinese Publication No. CN101808323, Aug. 18, 2010, 8 pages.
Machine Translation and Abstract of Chinese Publication No. CN103781023, May 7, 2014, 10 pages.
Machine Translation and Abstract of Chinese Publication No. CN104093147, Oct. 8, 2014, 5 pages.
Machine Translation and Abstract of Chinese Publication No. CN104144415, Nov. 12, 2014, 18 pages.
Machine Translation and Abstract of Chinese Publication No. CN104735814, Jun. 24, 2015, 21 pages.
Machine Translation and Abstract of Chinese Publication No. CN105188024, Dec. 23, 2015, 35 pages.
Machine Translation and Abstract of Chinese Publication No. CN105592462, May 18, 2016, 5 pages.
Eleni, D., et al.,"Security and Resilience of Smart Home Environments," Good practices and recommendations, European Union Agency For Network And Information Security, Dec. 2015, 77 pages.
Foreign Communication From A Counterpart Application, European Application No. 17898634.5, Extended European Search Report dated Oct. 31, 2019, 11 pages.
Foreign Communication From A Counterpart Application, PCT Application No. PCT/CN2017/089418, English Translation of International Search Report dated Nov. 23, 2017, 3 pages.
Foreign Communication From A Counterpart Application, PCT Application No. PCT/CN2017/089418, English Translation of Written Opinion dated Nov. 23, 2017, 4 pages.

* cited by examiner

NETWORK CONNECTION METHOD, MOBILE TERMINAL, ELECTRONIC DEVICE, AND GRAPHICAL USER INTERFACE

CROSS-REFERENCE TO RELATED APPLICATIONS

This application is a National Stage of International Application No. PCT/CN2017/089418, filed on Jun. 21, 2017, which claims priority to International Application No. PCT/CN2017/082608, filed on Apr. 28, 2017 and Chinese Patent Application No. 201710125084.5, filed on Mar. 3, 2017. Both of the aforementioned applications are hereby incorporated by reference in their entireties.

TECHNICAL FIELD

The present invention relates to the field of electronic technologies, and in particular, to a network connection method, a mobile terminal, an electronic device, and a graphical user interface.

BACKGROUND

In recent years, smart home has developed rapidly, and an increasing quantity of wireless smart hardware electronic devices (referred to as "electronic devices" for short) are used in homes. Most of these electronic devices are aftermarket-installed products, so that users (who use electronic devices) need to configure connections to gateways for the devices. For example, Wi-Fi (a Tireless local area network technology created based on the IEEE 802.11 standards) is most commonly used for wireless connection. A gateway used correspondingly during Wi-Fi connection is a Wi-Fi router. Statistics show that more than half of the users have complained about network connection failures of the smart hardware electronic devices. Therefore, how to improve user experience during network connection and implement secure and fast network connection becomes a key problem to be resolved for various smart home solutions and smart hardware electronic devices.

Current mainstream network connection schemes for smart hardware are classified into the following types: automatic network connection, where an electronic device and a gateway agree on, based on a standard-defined key exchange protocol, an ephemeral key for encrypted communication, without a need to download a specified app (application software) or manually enter a password by a user, ensuring convenient network connection for the electronic device while having a security risk of susceptibility to interference from a neighbor; and a SoftAPP (SoftAPP) network connection scheme. Where an app needs to be downloaded and a user needs to manually enter a password, and therefore the scheme can ensure security.

SUMMARY

A network connection method, a mobile terminal, an electronic device, and a graphical user interface that are provided in some embodiments of the present invention are intended to avoid a security risk of interference from a neighboring network during network connection of an electronic device to prevent a malicious attack or incorrect connection to the neighboring network; and reduce complexity of a network connection operation that a user needs to perform, improve user experience during network connection, and implement secure and fast network connection.

According to a first aspect, some embodiments of the present invention provide a method for connecting an electronic device to a network with cooperation of a mobile terminal, where the method includes: sending, by the electronic device, a wireless signal; detecting, by the mobile terminal, the wireless signal sent by the electronic device, and indicating that the electronic device is discovered; obtaining, by the mobile terminal, a network connection confirm operation performed on the mobile terminal, and providing a notification to the electronic device; after receiving the notification, decreasing, by the electronic device, a signal transmit power; prompting, by the mobile terminal, a user to hold the mobile terminal and move closer to the electronic device, and indicating a detected signal strength of the electronic device in real time; sending, by the mobile terminal, a wireless network key to the electronic device when a preset condition is met in a process in which the mobile terminal moves closer to the electronic device; and after receiving the wireless network key, increasing, by the electronic device, the signal transmit power, and connecting to the wireless network based on the wireless network key. According to this method, the electronic device decreases the transmit power, and performs key exchange after the mobile terminal is close enough to the electronic device, preventing the electronic device from being discovered and bound by a neighbor gateway supporting a same protocol as the electronic device. In addition, the mobile terminal directly sends the wireless network key to the electronic device, without requiring the user to manually enter the key. This improves user experience and is suitable for large-scale network deployment.

In some embodiments, the decreasing, by the electronic device, a signal transmit power includes: after receiving the notification, decreasing, by the electronic device, the signal transmit power to be within a first threshold range, so that a transmitted signal is not detected by another mobile terminal or router when being outside a preset distance range or after being attenuated by an obstacle.

In some embodiments, before the sending, by the mobile terminal, a wireless network key to the electronic device when the preset condition is met in the process in which the mobile terminal moves closer to the electronic device, the method further includes:
performing, by the electronic device, key exchange with the mobile terminal, to agree on an ephemeral key for encrypted communication; and
sending, by the terminal device, the wireless network key to the electronic device based on encrypted communication.

According to a second aspect, some embodiments of the present invention provide a method for connecting an electronic device to a network, where the method includes: sending, by the electronic device, a wireless signal; after receiving a notification that a mobile terminal has obtained a network connection confirm operation, decreasing, by the electronic device, a signal transmit power; when a preset condition is met in a process in which the mobile terminal moves closer to the electronic device, receiving, by the electronic device, a wireless network key sent by the mobile terminal; and after receiving the wireless network key, restoring, by the electronic device, the signal transmit power, and connecting to the wireless network based on the wireless network key.

In some embodiments, the sending a wireless signal includes: broadcasting, by the electronic device, a beacon frame.

In some embodiments, the decreasing a signal transmit power includes: decreasing, by the electronic device, the signal transmit power to be within a first threshold range, so that a transmitted signal is not detected by another mobile terminal or router when being outside a preset distance range or after being attenuated by an obstacle.

In some embodiments, the first threshold range is −90 dBm to −110 dBm.

In some embodiments, before the receiving, when a preset condition is met in a process in which the mobile terminal moves closer to the electronic device, a wireless network key sent by the mobile terminal, the method further includes: performing, by the electronic device, key exchange with the mobile terminal, to agree on an ephemeral key for encrypted communication; and receiving, by the electronic device, the wireless network key sent by the terminal device by using the ephemeral key.

In some embodiments, the method further includes: after the electronic device is successfully connected to the wireless network, providing a notification to the mobile terminal.

In some embodiments, the method further includes: after connecting to the wireless network, completing, by the electronic device, online registration and authentication of the electronic device by using the wireless network.

According to a third aspect, some embodiments of the present invention provide a cooperation method on a mobile terminal side for connecting a device to a network, where the method includes: when detecting a wireless signal sent by the electronic device, indicating that the electronic device is discovered; obtaining a network connection confirm operation performed on the mobile terminal, and providing a notification to the electronic device; prompting a user to hold the mobile terminal and move closer to the electronic device, and indicating a detected signal strength of the electronic device or a movement status of the mobile terminal; and sending a wireless network key to the electronic device when a preset condition is met in a process of moving closer to the electronic device.

In some embodiments, the method further includes: starting, by the mobile terminal, searching for the wireless signal in response to a search trigger operation performed by the user.

In some embodiments, the indicating, when detecting a wireless signal sent by the electronic device, that the electronic device is discovered includes: when detecting the wireless signal, displaying, by the mobile terminal, information on a display interface, to indicate that the electronic device is discovered.

In some embodiments, the indicating, on the display interface, that the electronic device is discovered includes: indicating, by the mobile terminal, at least one of the following device information of the electronic device: a device type, a device name, and a device ID.

In some embodiments, the prompting a user to hold the mobile terminal and move closer to the electronic device, and indicating a detected signal strength of the electronic device or a movement status of the mobile terminal further includes: indicating, by the mobile terminal, information about a movement direction and/or a distance relative to the electronic device.

In some embodiments, the indicating a detected signal strength of the electronic device includes: displaying, by the mobile terminal, the detected signal strength of the electronic device on the display device in real time.

In some embodiments, the indicating a detected signal strength of the electronic device includes: indicating, by the mobile terminal, the detected signal strength of the electronic device by using a digit, an icon, or a character.

In some embodiments, before the sending a wireless network key to the electronic device when a preset condition is met in a process of moving closer to the electronic device, the method further includes: performing, by the mobile terminal, key exchange with the electronic device, to agree on an ephemeral key for encrypted communication; and sending, by the mobile terminal, the wireless network key to the electronic device by using the ephemeral key.

In some embodiments, the sending a wireless network key to the electronic device when a preset condition is met in a process of moving closer to the electronic device includes: when the preset condition is met in the process of moving closer to the electronic device, displaying, by the mobile terminal, a list on the display interface, where the list includes information about at least one wireless network; and obtaining, by the mobile terminal, a select operation performed on the list by the user on the mobile terminal, and sending the wireless network key corresponding to the select operation to the electronic device.

In some embodiments, the method further includes: after sending the wireless network key to the electronic device, receiving, by the mobile terminal, a notification that the electronic device is connected to the wireless network, and indicating that the electronic device is connected to the wireless network.

According to a fourth aspect, some embodiments of the present invention provide an electronic device, where the electronic device includes one or more processors, a memory, a plurality of application programs, and one or more programs, where the one or more programs are stored in the memory and configured to be executed by the one or more processors, the one or more programs include instructions, and the instructions are used to: send a wireless signal; decrease a signal transmit power after a notification that a mobile terminal has obtained a network connection confirm operation is received; when a preset condition is met in a process in which the mobile terminal moves closer to the electronic device, receive a wireless network key sent by the mobile terminal; and after the wireless network key is received, restore the signal transmit power, and connect the electronic device to a wireless network based on the wireless network key.

In some embodiments, the instructions for sending the wireless signal includes broadcasting a beacon frame.

In some embodiments, the instructions for decreasing the signal transmit power includes: decreasing the signal transmit power to be within a first threshold range, so that a transmitted signal is not detected by another mobile terminal or router when being outside a preset distance range or after being attenuated by an obstacle.

In some embodiments, the first threshold range is −90 dBm to −110 dBm.

In some embodiments, before the wireless network key sent by the mobile terminal is received when the preset condition is met in the process in which the mobile terminal moves closer to the electronic device, the instructions are further used to: perform key exchange with the mobile terminal, to agree on an ephemeral key for encrypted communication; and receive the wireless network key sent by the terminal device by using the ephemeral key.

In some embodiments, the instructions are further used to: after the electronic device is successfully connected to the wireless network, provide a notification to the mobile terminal.

In some embodiments, the instructions are further used to: after the electronic device is connected to the wireless network, complete online registration and authentication of the electronic device by using the wireless network.

According to a fifth aspect, some embodiments of the present invention provide a mobile terminal, where the mobile terminal includes one or more processors, a memory, a plurality of application programs, and one or more programs, where the one or more programs are stored in the memory and configured to be executed by the one or more processors, the one or more programs include instructions, and the instructions are used to: when a wireless signal sent by the electronic device is detected, indicate that the electronic device is discovered; obtain a network connection confirm operation performed on the mobile terminal, and provide a notification to the electronic device; after the network connection confirm operation is obtained, prompt a user to hold the mobile terminal and move closer to the electronic device, and indicate a detected signal strength of the electronic device or a movement status of the mobile terminal; and send a wireless network key to the electronic device when a preset condition is met in a process of moving closer to the electronic device.

In some embodiments, before the wireless signal sent by the electronic device is detected, the instructions are further used to start searching for the wireless signal in response to a search trigger operation performed by the user.

In some embodiments, the instructions for indicating, when the wireless signal sent by the electronic device is detected, that the electronic device is discovered is used to: when a beacon frame broadcast by the electronic device is detected, display information on a display interface, to indicate that the electronic device is discovered.

In some embodiments, the instructions for indicating, on the display interface, that the electronic device is discovered is used to indicate at least one of the following device information of the electronic device: a device type, a device name, and a device ID.

In some embodiments, the instructions for prompting the user to hold the mobile terminal and move closer to the electronic device, and indicating the detected signal strength of the electronic device or a movement status of the mobile terminal is further used to indicate, on the mobile terminal, information about a movement direction and/or a distance relative to the electronic device.

In some embodiments, the instructions for indicating the detected signal strength of the electronic device is used to display the detected signal strength of the electronic device on the display device in real time.

In some embodiments, the instructions for indicating the detected signal strength of the electronic device is used to indicate the detected signal strength of the electronic device by using a digit, an icon, or a character.

In some embodiments, before the wireless network key is sent to the electronic device when the preset condition is met in the process of moving closer to the electronic device, the instructions are further used to: perform key exchange with the electronic device, to agree on an ephemeral key for encrypted communication; and send the wireless network key to the electronic device by using the ephemeral key.

In some embodiments, the instructions for sending the wireless network key to the electronic device when the preset condition is met in the process of moving closer to the electronic device is used to display a list on the display interface when the preset condition is met in the process of moving closer to the electronic device, where the list includes information about at least one wireless network; and obtain a select operation performed on the list by the user on the mobile terminal, and send the wireless network key corresponding to the select operation to the electronic device.

In some embodiments, the instructions are further used to: after the wireless network key is sent to the electronic device, receive a notification that the electronic device is connected to the wireless network, and indicate that the electronic device is connected to the wireless network.

According to a sixth aspect, some embodiments of the present invention provide an electronic device, where the electronic device includes a wireless signal transceiver apparatus, a power amplifier, and a network connection apparatus, where the wireless signal transceiver apparatus is configured to send a wireless signal; the power amplifier is configured to: decrease a signal transmit power of the wireless signal transceiver apparatus after receiving a notification that a mobile terminal has obtained a network connection confirm operation; the wireless transceiver apparatus is further configured to: when a preset condition is met in a process in which the mobile terminal moves closer to the electronic device, obtain, by using the wireless signal transceiver apparatus, a wireless network key sent by the mobile terminal; the network connection apparatus is configured to connect the electronic device to a wireless network based on the wireless network key received by the wireless signal transceiver apparatus; and the power amplifier is further configured to restore the signal transmit power of the wireless signal transceiver apparatus after the wireless signal transceiver apparatus receives the wireless network key.

In some embodiments, the wireless signal transceiver apparatus is a Wi-Fi apparatus, and the Wi-Fi apparatus is configured to broadcast a beacon frame.

In some embodiments, the power amplifier is configured to decrease the signal transmit power of the wireless signal transmit apparatus to be within a first threshold range, so that a transmitted signal is not detected by another mobile terminal or router when being outside a preset distance range or after being attenuated by an obstacle.

In some embodiments, the first threshold range is −90 dBm to −110 dBm.

In some embodiments, the wireless signal transceiver apparatus includes: a first module, configured to perform key exchange with the mobile terminal, to agree on an ephemeral key for encrypted communication; and a second module, configured to receive the wireless network key sent by the terminal device by using the ephemeral key.

In some embodiments, the electronic device further includes a notification apparatus, configured to: after the electronic device is successfully connected to the wireless network, provide a notification to the mobile terminal.

In some embodiments, the electronic device further includes a registration apparatus, configured to: after the electronic device is connected to the wireless network, complete online registration and authentication of the electronic device by using the wireless network.

According to a seventh aspect, some embodiments of the present invention provide a mobile terminal, where the mobile terminal includes a wireless signal transceiver apparatus, an indicating apparatus, and an obtaining apparatus, where the wireless signal transceiver apparatus is configured to search for a wireless signal sent by the electronic device; the indicating apparatus is configured to: when the wireless signal transceiver apparatus detects the wireless signal sent by the electronic device, indicate that the electronic device is discovered; the obtaining apparatus is configured to: obtain a network connection confirm operation performed on the mobile terminal, and provide a notification to the electronic device; the indicating apparatus is further configured to: after the obtaining apparatus obtains the network connection confirm operation, prompt a user to hold the mobile terminal and move closer to the electronic device, and indicate a detected signal strength of the electronic device or a movement status of the mobile terminal; and the wireless signal transceiver apparatus is further configured to: when a preset condition is met in a process in which the mobile terminal moves closer to the electronic device, send a wireless network key to the electronic device.

In some embodiments, the wireless signal transceiver apparatus is configured to start searching for the wireless signal in response to a search trigger operation performed by the user.

In some embodiments, the indicating apparatus is a display screen, and the display screen is configured to: when the wireless signal is detected, display indication information to indicate that the electronic device is discovered.

In some embodiments, the display screen is configured to indicate that at least one of the following device information of the electronic device is discovered: a device type, a device name, and a device ID.

In some embodiments, the display screen is further configured to indicate information about a movement direction and/or a distance relative to the electronic device.

In some embodiments, the indicating apparatus is configured to display a detected signal strength of the electronic device in real time on the display device.

In some embodiments, the indicating apparatus is configured to indicate the detected signal strength of the electronic device by using a digit, an icon, or a character.

In some embodiments, the wireless signal transceiver apparatus includes: a first module, configured to perform key exchange with the electronic device, to agree on an ephemeral key for encrypted communication; and a second module, configured to send the wireless network key to the electronic device by using the ephemeral key.

In some embodiments, the indicating apparatus is configured to display a list when the preset condition is met in the process of moving closer to the electronic device, where the list includes information about at least one wireless network; the obtaining apparatus is configured to obtain a select operation performed on the list by the user on the mobile terminal; and the wireless signal transceiver apparatus is configured to send the wireless network key corresponding to the select operation to the electronic device.

In some embodiments, the indicating apparatus is further configured to: after the wireless network key is sent to the electronic device and a notification that the electronic device is connected to the wireless network is received, indicate that the electronic device is connected to the wireless network.

According to a seventh aspect, some embodiments of the present invention provide a system for connecting an electronic device to a network with cooperation of a mobile terminal, where the system includes an electronic device and a mobile terminal, and the electronic device and the mobile terminal are configured to execute the method described in the first aspect.

According to an eighth aspect, some embodiments of the present invention provide a graphical user interface on a mobile terminal with a display apparatus, where the graphical user interface includes:

in response to a case in which a wireless signal sent by the electronic device is detected, displaying information indicating that the electronic device is discovered;

in response to obtaining of a network connection confirm operation performed by a user, displaying prompt information for prompting the user to hold the mobile terminal and move closer to the electronic device, and displaying a detected signal strength of the electronic device; and in response to a case in which a preset condition is met in a process in which the mobile terminal moves closer to the electronic device, displaying information indicating that a wireless network key is sent to the electronic device.

In some embodiments, the graphical user interface further includes:

in response to reception of a notification that the electronic device is successfully connected to a wireless network, displaying an indication message that the electronic device is connected to the wireless network.

According to a ninth aspect, some embodiments of the present invention provide a computer-readable storage medium, including instructions, where when the instructions run on a computer, the computer executes the method according to any one of the embodiments of the second aspect.

According to a tenth aspect, some embodiments of the present invention provide a computer-readable storage medium, including instructions, where when the instructions run on a computer, the computer executes the method according to any one of the embodiments of the third aspect.

According to an eleventh aspect, some embodiments of the present invention provide a computer program product including instructions, where when the product runs on a computer, the computer executes the method according to any one of the embodiments of the second aspect.

According to a twelfth aspect, some embodiments of the present invention provide a computer program product including instructions, where when the product runs on a computer, the computer executes the method according to any one of the embodiments of the second aspect.

DESCRIPTION OF EMBODIMENTS

Figure 1:
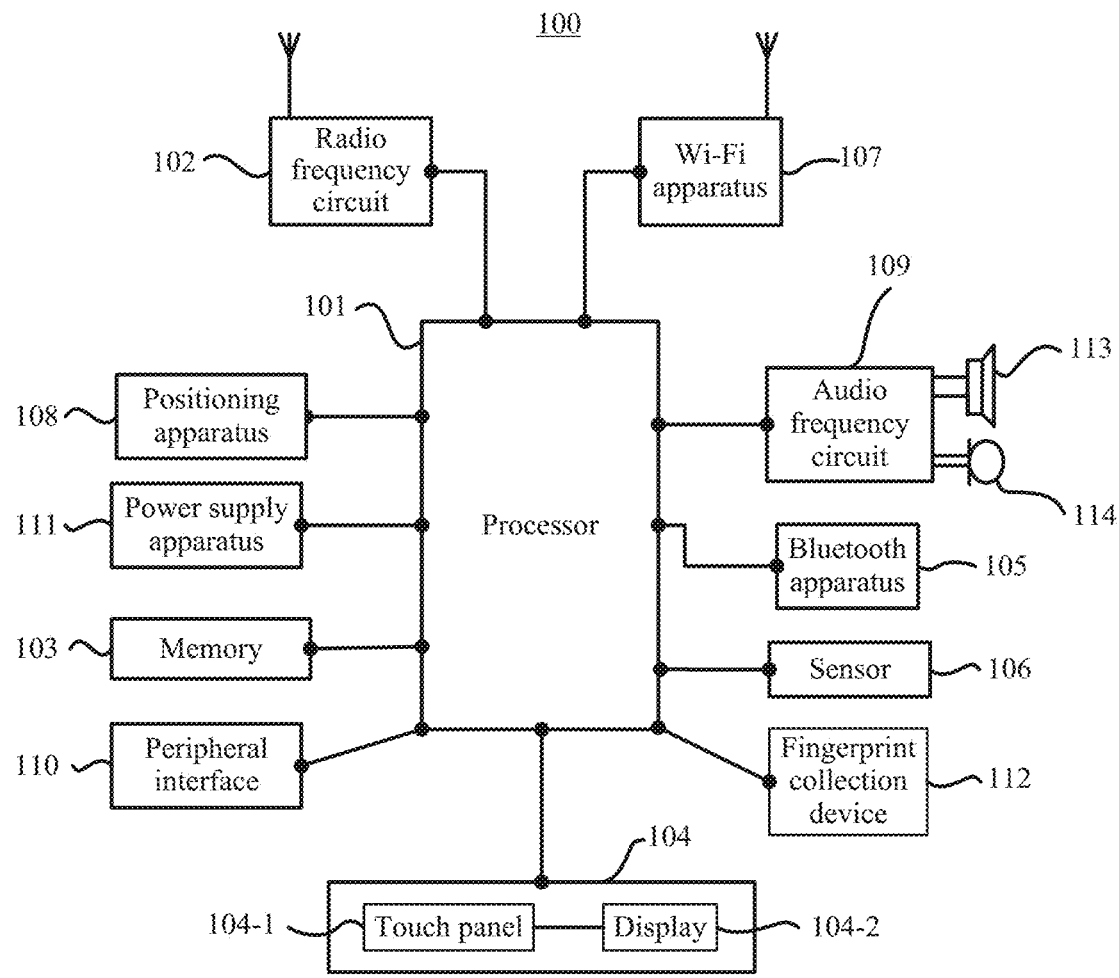
FIG. 1 is a schematic structural diagram of a mobile terminal according to an embodiment of the present invention.

Terms used in the embodiments of the present invention are merely for a purpose of describing specific embodiments, and are not intended to limit the present invention. Terms "one", "one type of", "the", "the foregoing", and "this" of singular forms used in this specification and the appended claims of the present invention are also intended to include plural forms, unless otherwise specified in the context clearly. It should be further understood that the term "and/or" possibly used in the present invention indicates and includes any or all possible combinations of one or more associated listed items.

The following describes a mobile terminal, an electronic device, a graphical user interface (which may be referred to as a GUI below) applied to such a mobile terminal, an electronic device, and embodiments of network connection processes of the electronic device with cooperation of the mobile terminal.

In the embodiments of the present invention, when the electronic device is installed or connected to a network for a first time, key verification and the like for security authentication is usually configured on a gateway for security concerns during network connection, and the electronic device is connected to the network after being authenticated. Therefore, the electronic device usually needs to connect to the gateway by using a mobile security agent device. Wi-Fi is commonly used for wireless connection. Wi-Fi is a wireless local area network technology created based on the IEEE 802.11 standards. IEEE 802.11 is a set of universal standards for current wireless local area networks. It is a set of wireless network communication standards defined by the Institute of Electrical and Electronics Engineers. A gateway used correspondingly during Wi-Fi connection is a Wi-Fi router. A commonly used mobile security agent device may be a mobile terminal such as a mobile phone, a tablet computer, a smart remote control, or a smart environment monitor. The embodiments of the present invention can avoid a security risk of interference from a neighboring network during network connection of the electronic device, to prevent a malicious attack or incorrect connection to the neighboring network; and reduce complexity of a network connection operation that a user needs to perform, improve user experience during network connection, and implement secure and fast network connection. The embodiments of the present invention can be applied to large-scale network deployment.

The following further describes technical solutions in the embodiments with reference to the accompanying drawings in the embodiments.

In some embodiments of the present invention, the mobile terminal may be a portable electronic device that further includes other functions such as a personal digital assistant function and/or a music player function, such as a mobile phone, a tablet computer, or a wearable electronic device (such as a smartwatch) with a wireless communication function. An example embodiment of the portable electronic device includes but is not limited to a portable electronic device carrying iOS®, Android®, Microsoft®, or another operating system. The foregoing portable electronic device may alternatively be another portable electronic device, such as a laptop computer (Laptop) having a touch-sensitive surface (such as a touch panel). It should be further understood that, in some other embodiments of the present invention, the mobile terminal may alternatively be a device that can be used as a mobile security agent, such as a remote control conforming to a similar specification or a smart environment detector.

As shown in FIG. 1, a mobile terminal in an embodiment of the present invention may be a mobile phone 100. The following specifically describes the embodiment by using the mobile phone 100 as an example. It should be understood that the mobile phone 100 shown in the figure is merely an example of the mobile terminal, and that the mobile phone 100 may include more or fewer components than those shown in the figure, may include a combination of two or more components, or may include components configured differently. The components shown in the figure may be implemented by using hardware including one or more signal processing units and/or an application-specific integrated circuit, software, or a combination of the hardware and software.

As shown in FIG. 1, the mobile phone 100 may specifically include components such as a processor 101, a radio frequency (RF) circuit 102, a memory 103, a touchscreen 104, a Bluetooth apparatus 105, one or more sensors 106, a Wi-Fi apparatus 107, a positioning apparatus 108, an audio frequency circuit 109, a peripheral interface 110, and a power system 111. These components may communicate with each other by using one or more communications buses or signal lines (not shown in FIG. 1). A person skilled in the art may understand that a hardware structure shown in FIG. 1 does not constitute a limitation on the mobile phone 100, and the mobile phone 100 may include more or fewer components than those shown in the figure, or a combination of some components, or components disposed differently.

The following describes each component of the mobile phone 100 in detail with reference to FIG. 1.

The processor 101 is a control center of the mobile phone 100, is connected to all parts of the mobile phone 100 by using various interfaces and lines, and runs or executes an application program (which may be referred to as an app below) stored in the memory 103 and invokes data and instructions that are stored in the memory 103 to implement various functions of the mobile phone 100 and/or process data. In some embodiments, the processor 101 may include one or more processing units. An application processor and a modem processor may be further integrated into the processor 101. The application processor mainly processes an operating system, a user interface, an application program, and the like. The modem processor mainly processes wireless communication. It can be understood that the modern processor may alternatively be not integrated into the processor 101. The processor 101 may be an integrated chip. In some embodiments of the present invention, the processor 101 may further include a fingerprint verification chip, configured to verify a collected fingerprint.

The radio frequency circuit 102 may be configured to receive and send wireless signals in an information receiving and sending process or a call process. Specifically, the radio frequency circuit 102 may receive downlink data of a base station, and sends the downlink data for the processor 101 for processing*. In addition, the radio frequency circuit 102 sends uplink data to the base station. Generally, the radio frequency circuit includes but is not limited to an antenna, at least one amplifier, a transceiver, a coupler, a low noise amplifier, a duplexer, and the like. In addition, the radio frequency circuit 102 may further communicate with another device through wireless communication. Any communications standard or protocol may be used for wireless communication, including but not limited to the Global System for Mobile Communications, a general packet radio service. Code Division Multiple Access, Wideband Code Division Multiple Access, Long Term Evolution, an e-mail, a short message service, and the like.

The memory 103 is configured to store an application program and data. The processor 101 runs the application program and the data that are stored in the memory 103 to implement various functions of the mobile phone 100 and process data. The memory 103 mainly includes a program storage area and a data storage area. The program storage area may store an operating system and an application program required by at least one function such as an audio playback function and an image playback function). The data storage area may store data (such as audio data and a phone book) that is created according to use of the mobile phone 100. In addition, the memory 103 may include a high-speed random access memory, and may further include a non-volatile memory such as a disk storage device, a flash memory device, or another volatile storage device. The memory 103 may store various operating systems, such as an iOS® operating system developed by Apple and an Android® operating system developed by Google.

The touchscreen 104 may include a touch panel 104-1 and a display 104-2. The touch panel 104-1 may collect a touch event performed on or near the touch panel 104-1 by a user of the mobile phone 100 (for example, an operation performed on the touch panel 104-1 or near the touch panel 104-1 by the user by using any suitable object such as a finger or a stylus), and send collected touch information to another device such as the processor 101. The touch event performed near the touch panel 104-1 by the user may be referred to as a floating touch. The floating touch may mean: The user does not need to directly touch the touch panel to select, move, or drag a target (for example, an icon), but instead, the user just needs to be located near the mobile terminal to implement a desired function. In a floating touch application scenario, terms such as "touch" and "contact" do not imply a direct contact with the touchscreen but a contact near the touchscreen. The touch panel 104-1 supporting floating touch may be implemented by using a capacitive type, an infrared light sensing type, an ultrasonic wave type, or the like. The touch panel 104-1 may include two parts: a touch detection apparatus and a touch controller. The touch detection apparatus detects a touch orientation of the user, detects a signal generated by a touch operation, and transmits the signal to the touch controller. The touch controller receives touch information from the touch detection apparatus, converts the touch information into contact coordinates, and sends the contact coordinates to the processor 101. The touch controller may further receive instructions sent by the processor 101 and execute the instruction. In addition, the touch panel 104-1 may be implemented by using a plurality of types, such as a resistive type, a capacitive type, an infrared type, and a surface acoustic wave type. The display (also referred to as a display screen) 104-2 may be configured to display information entered by the user or information provided for the user and various menus of the mobile phone 100. The display 104-2 may be configured in a form of a liquid crystal display, an organic light-emitting diode, or the like. The touch panel 104-1 may cover the display 104-2. After detecting the touch event performed on or near the touch panel 104-1, the touch panel 104-1 sends information about the touch event to the processor 101 to determine a type of the touch event, and then the processor 101 provides corresponding visual output on the display 104-2 according to the type of the touch event. In FIG. 1, the touch panel 104-1 and the display screen 104-2 are used as two separate components to implement input and output functions of the mobile phone 100. However, in some embodiments, the touch panel 104-1 and the display screen 104-2 may be integrated to implement the input and output functions of the mobile phone 100. It can be understood that the touchscreen 104 is formed by stacking a plurality of layers of materials. Only the touch panel (layer) and the display screen (layer) are described in this embodiment of the present invention, and another layer is not described in this embodiment of the present invention. In addition, in some other embodiments of the present invention, the touch panel 104-1 may cover the display 104-2, and a size of the touch panel 104-1 is greater than a size of the display screen 104-2, so that the display screen 104-2 is completely covered by the touch panel 104-1. Alternatively, the touch panel 104-1 may be disposed on a front of the mobile phone 100 in a form of a full-surface panel, that is, all touches of the user on the front of the mobile phone 100 can be sensed by the mobile phone. In this way, all-touch experience on the front of the mobile phone can be provided. In some other embodiments, the touch panel 104-1 is disposed on the front of the mobile phone 100 in the form of a full-surface panel, and the display screen 104-2 may also be disposed on the front of the mobile phone 100 in the form of a full-surface panel, so that a bezel (Bezel)—less structure can be implemented on the front of the mobile phone.

In this embodiment of the present invention, the mobile phone 100 may further have a fingerprint recognition function. For example, a fingerprint recognizer may be disposed on a back (for example, below a rear camera) of the mobile phone 100, or a fingerprint recognizer may be disposed on the front (for example, below the touchscreen 104) of the mobile phone 100. No further details are provided herein.

The mobile phone 100 may further include the Bluetooth apparatus 105, configured to implement data exchange between the mobile phone 100 and another mobile terminal (such as a mobile phone or a smartwatch) with a short distance from the mobile phone 100. The Bluetooth apparatus in this embodiment of the present invention may be an integrated circuit, a Bluetooth chip, or the like.

The mobile phone 100 may further include at least one type of sensor 106, such as a light sensor, a motion sensor, or another sensor. Specifically, the light sensor may include an ambient light sensor and a proximity sensor. The ambient light sensor may adjust luminance of the display of the touchscreen 104 based on brightness of ambient light. The proximity sensor may turn off power of the display when the mobile phone 100 moves closer to an ear. As a type of motion sensor, an accelerometer sensor can detect values of accelerations in all directions (usually three axes), can detect a value and a direction of gravity when the mobile phone 100 is static, and can be applied to an application for identifying a mobile phone posture (such as screen switching between a landscape mode and a portrait mode, a related game, or magnetometer posture calibration), a vibration-recognition-related function (such as a pedometer or tapping), and the like. For another sensor that may be further configured in the mobile phone 100, such as a gyroscope, a barometer, a hygrometer, a thermometer, or an infrared sensor, details are not described herein.

The Wi-Fi apparatus 107 is configured to provide network connection complying with a Wi-Fi related standard protocol to the mobile phone 100, and the mobile phone 100 may connect to a Wi-Fi access point by using the Wi-Fi apparatus 107, to help the user to send and receive emails, browse a web page, access streaming media, and the like. The Wi-Fi apparatus 107 provides wireless broadband Internet access to the user. In some other embodiments, the Wi-Fi apparatus 107 may alternatively serve as a Wi-Fi wireless access point that can provide Wi-Fi network connection to another mobile terminal.

The positioning apparatus 108 is configured to provide a geographic location to the mobile phone 100. It can be understood that the positioning apparatus 108 may be specifically a receiver of a positioning system such as the Global Positioning System (GPS), the BeiDou Navigation Satellite System, or the GLONASS of Russia. After receiving the geographic location sent by the positioning system, the positioning apparatus 108 sends the information to the processor 101 for processing, or sends the information to the memory 103 for storage. In some other embodiments, the positioning apparatus 108 may be a receiver of the Assisted Global Positioning System (AGPS). The AGPS is an operation manner for performing GPS positioning with specific assistance. The AGPS can provide a higher positioning speed for the mobile phone 100 by utilizing a signal of the base station in combination with a GPS satellite signal. In the AGPS, the positioning apparatus 108 can obtain positioning assistance by communicating with an auxiliary positioning server (for example, a mobile phone positioning server). In the AGPS, the auxiliary server assists the positioning apparatus 108 in performing ranging and positioning services. In this case, the auxiliary positioning server communicates with the mobile terminal, such as the positioning apparatus 108 (namely, the GPS receiver) of the mobile phone 100, by using a wireless communications network, to provide the positioning assistance. In some other embodiments, the positioning apparatus 108 may alternatively use a positioning technology based on a Wi-Fi access point. Because each Wi-Fi access point has a globally unique MAC address, the mobile terminal can scan for and collect broadcast signals of surrounding Wi-Fi access points when Wi-Fi is enabled, so as to obtain MAC addresses broadcast by the Wi-Fi access points. The mobile terminal sends, by using the wireless communications network, the data (such as the MAC addresses) that can identify the Wi-Fi access points to a location server, and the location server retrieves a geographic location of each access point, calculates a geographic location of the mobile terminal with reference to strengths of the broadcast signals, and sends the geographic location of the mobile terminal to the positioning apparatus 108 of the mobile terminal.

The audio frequency circuit 109, a loudspeaker 113, and a microphone 114 may provide an audio interface between the user and the mobile phone 100. The audio frequency circuit 109 may transmit, to the loudspeaker 113, an electrical signal that is obtained after conversion of received audio data, and the loudspeaker 113 converts the electrical signal into a sound signal for outputting. In addition, the microphone 114 converts a collected sound signal into an electrical signal, and the audio frequency circuit 109 receives the electrical signal and converts the electrical signal into audio data, and then outputs the audio data to the RF circuit 102, so that the audio data is sent to, for example, another mobile phone, or the audio data is output to the memory 103 for further processing.

The peripheral interface 110 is configured to provide various interfaces for external input/output devices (for example, a keyboard, a mouse, an external display, an external memory, and a subscriber identity module card). For example, the mobile phone 100 is connected to the mouse by using a universal serial bus (USB) interface, or is connected, by using a metal contact on a card slot for the subscriber identity module card, to the subscriber identity module (SIM) card provided by a telecom operator. The peripheral interface 110 may be configured to couple the foregoing external input/output peripherals to the processor 101 and the memory 103.

The mobile phone 100 may further include the power supply apparatus 111 (for example, a battery and a power management chip) that supplies power to the components. The battery may be logically connected to the processor 101 by using the power management chip, so that functions such as charging management, discharging management, and power consumption management are implemented by using the power supply apparatus 111.

Although not shown in FIG. 1, a camera (front-facing camera and/or rear-facing camera), a flash lamp, a micro projection apparatus, a Near Field Communication (NFC) apparatus, and the like may be further included in the mobile phone 100, and details are not described herein.

The following embodiments can all be implemented in the mobile phone 100 of the foregoing structure.

In some embodiments of the present invention, the electronic device may be a smart home (Smart Home) device, including various devices in a home that are connected by using an Internet of Things technology, such as an audio/video device, a lighting system, a curtain control system, an air conditioning control system, a security protection system, a digital cinema system, a video and audio server, a movie box system, or a network home appliance. The electronic device has a data processing capability, and can not only provide a conventional residential function, but also support a user in performing smart functions, such as remote control and timing control, by using a mobile terminal over a network. It should be further understood that, in some other embodiments of the present invention, the electronic device may alternatively be another device that needs to perform network connection and can implement network connection with cooperation of a mobile terminal.

Figure 6:
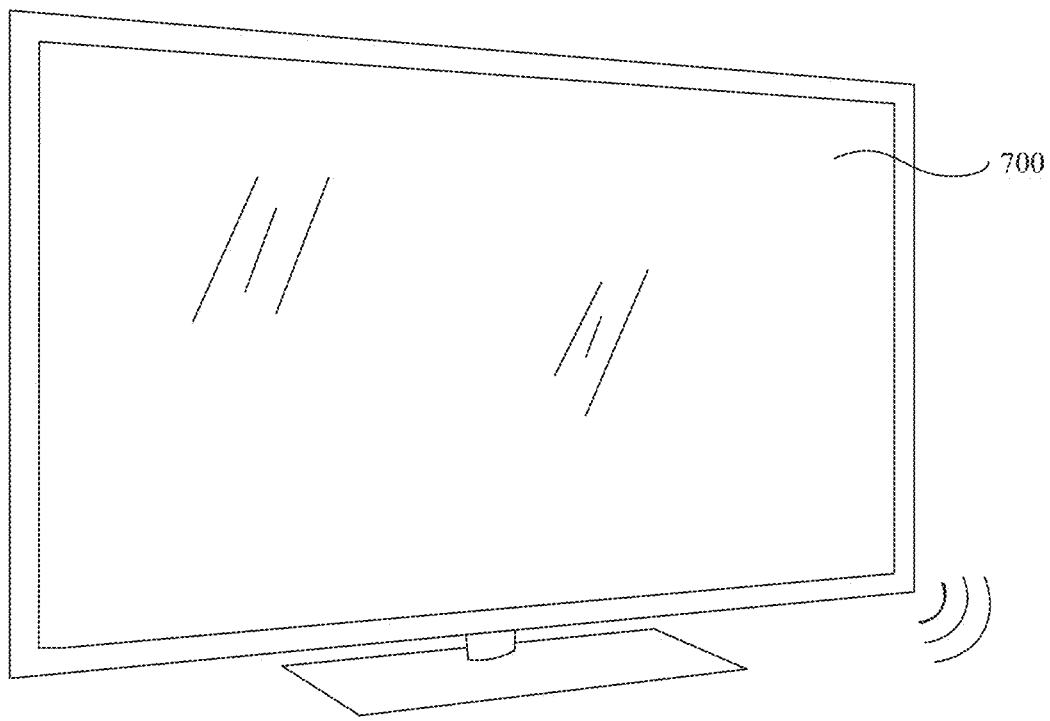
FIG. 6 to FIG. 15 are schematic diagrams of scenarios provided in some embodiments of this application.

In some embodiments, the electronic device may be a smart TV 700 shown in FIG. 6. In addition to apparatuses such as a display and a loudspeaker of an ordinary television, the smart TV 700 further includes a processor, a memory, and a network connection apparatus. The smart TV 700 can carry various operating systems, can be connected to the Internet, and can, like the mobile terminal, support a plurality of types of interactive applications. For example, the smart TV 700 can install, update, or delete an application according to a user.

Figure 2:
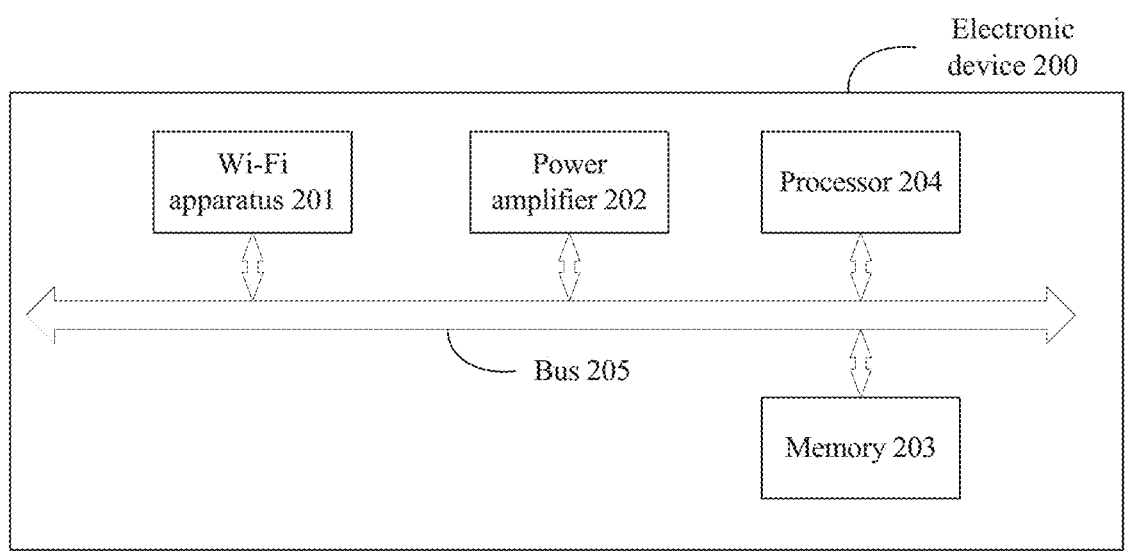
FIG. 2 is a schematic structural diagram of an electronic device according to an embodiment of the present invention.

FIG. 2 is a schematic structural diagram of an electronic device according to an embodiment. The electronic device 200 includes a Wi-Fi apparatus 201, a power amplifier 202, a memory 203, a processor 204, and a bus 205.

The Wi-Fi apparatus 201 can provide network connection complying with a Wi-Fi related standard protocol to the electronic device 200, and the electronic device 200 can connect to a Wi-Fi access point by using the Wi-Fi apparatus 201. In some embodiments, the Wi-Fi apparatus 201 may alternatively serve as a Wi-Fi wireless access point that can provide Wi-Fi network connection to a mobile terminal.

The power amplifier 202 is configured to adjust a signal transmit power of the Wi-Fi apparatus 201.

The memory 203 may include a RAM, a ROM, any fixed storage medium, or a removable storage medium, and is configured to store a program that can be used for executing this embodiment of the present invention or an application database in this embodiment of the present invention. The memory 203 receives input from another component by using the bus 205, or information stored in the memory 203 is invoked by another component by using the bus 205. The processor 204 is configured to: execute the program of this embodiment of the present invention that is stored in the memory 203, and perform bidirectional communication with another apparatus by using the bus. The memory 203 and the processor 204 may alternatively be integrated into a physical module applied to this embodiment of the present invention. The program for implementing this embodiment of the present invention is stored and run on the physical module. The components of the electronic device 200 are coupled together by using the bus system 205. The bus system 205 includes not only a data bus but also a power bus, a control bus, a status signal bus, and the like. However, for clear description, various buses are denoted as the bus system 205 in the figure.

The electronic device 200 may further include another wireless signal transmit apparatus such as a Bluetooth apparatus (not shown).

In some other embodiments, the electronic device 200 may further include a display and an input apparatus. The display may be an appropriate apparatus such as a cathode ray tube (CRT, Cathode Ray Tube) display, a liquid crystal display (LCD, Liquid Crystal Display), or a touchscreen (Touch Screen), and receives instructions by using the bus 205 so that a graphical user interface is displayed on a screen of the display. The input apparatus may include any appropriate apparatus such as a keyboard, a mouse, a track recognizer, or a speech recognition interface, and is configured to: receive user input, generate control input, and send the control input to the processor or another component by using the bus 205. Displays of some electronic devices 200 include a touchscreen. These displays are also input apparatuses.

The following describes a method for connecting an electronic device to a network with cooperation of a mobile terminal according to an embodiment of the present invention. When needing to perform network connection (for example, during initial network connection or when the electronic device needs to reconnect to a wireless network), the electronic device sends a wireless signal that can be recognized by the mobile device; after detecting the corresponding wireless signal, the mobile device indicates that the electronic device is discovered, and after obtaining a network connection confirm operation of a user, provides a notification to the electronic device; the electronic device then decreases a signal transmit power to ensure that a transmitted signal cannot be received by another router and another mobile device after a strength of the transmitted signal is decreased by a specific degree resulting from a partition wall or a long distance, thereby effectively avoiding neighbor interference; the mobile terminal indicates the detected signal strength of the electronic device, and when the mobile terminal is close enough to the electronic device, the mobile terminal and the electronic device perform key exchange, and the mobile terminal sends a wireless network key to the electronic device; and the electronic device dynamically changes and controls the transmit power according to a working mode, thereby ensuring that the device securely completes network connection.

Figure 3:
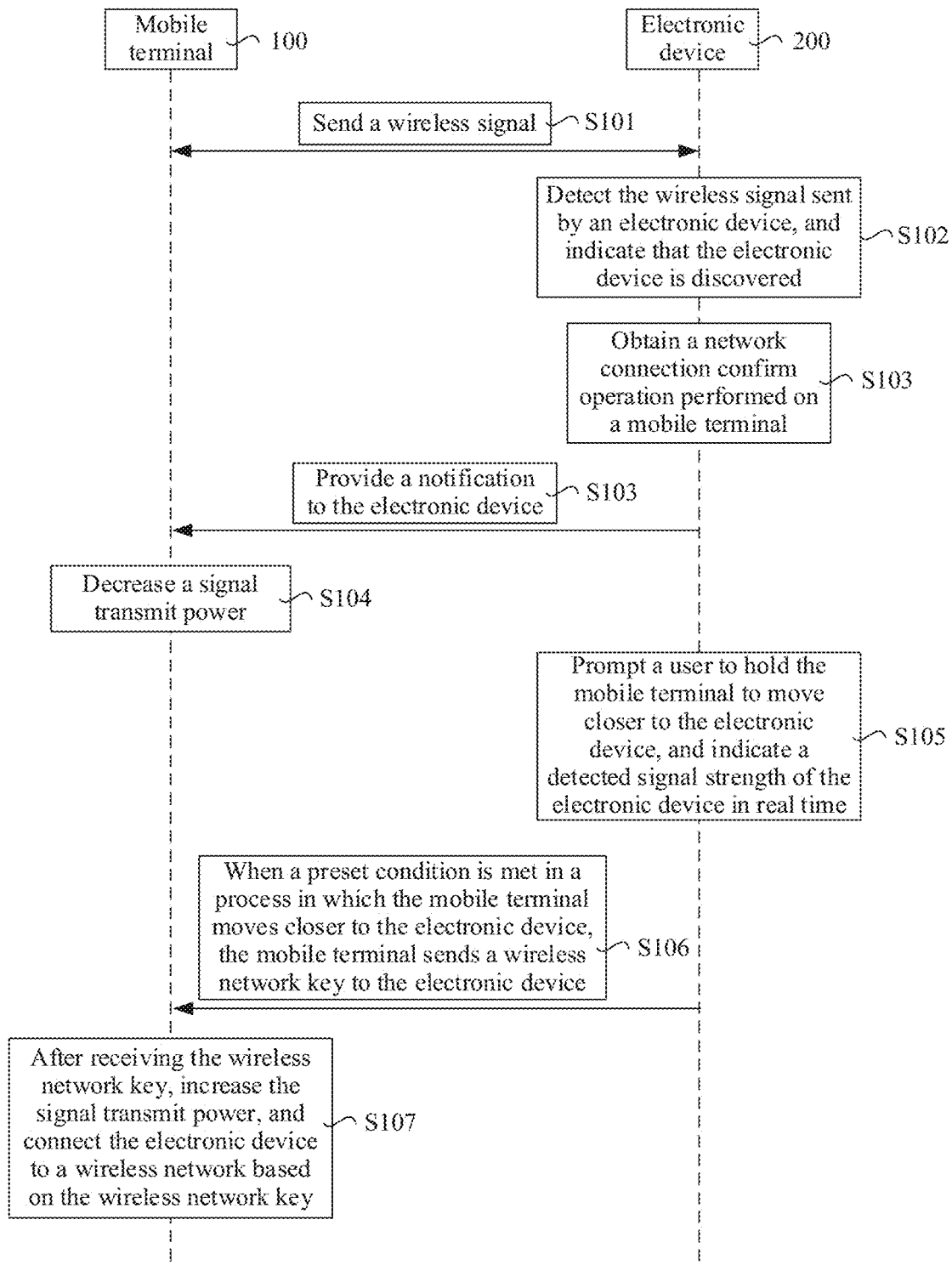
FIG. 3 is a schematic flowchart of a method for connecting an electronic device to a network with cooperation of a mobile terminal according to an embodiment of the present invention.

As shown in FIG. 3, the method includes step S101 to step 107. The following provides a further description with reference to the steps.

In step 101, as shown in FIG. 6, the electronic device 200 sends a wireless signal that waits to be detected by the mobile terminal. In some embodiments, the electronic device 200 may send the signal by using the apparatus 201. For example, the electronic device 200 may periodically broadcast a beacon (beacon) frame, so that the mobile terminal within a specific distance range can learn of existence of the electronic device 200. The beacon frame is a periodic frame in the IEEE 802.11 standards, and is a regular wireless signal (similar to a heartbeat packet) periodically sent by the electronic device 200 at a specified interval.

In some embodiments, the electronic device 200 may alternatively send another wireless signal, for example, send a Bluetooth signal (Bluetooth is a wireless technology standard that implements short-range data exchange) by using the Bluetooth apparatus, ZigBee (ZigBee is a wireless network protocol for low-speed short-range transmission), Z-Wave (a home automation wireless network), or the like.

In step 102, the mobile terminal detects the wireless signal sent by the electronic device 200, and indicates that the electronic device 200 is discovered.

In some embodiments, after obtaining a search trigger operation performed by a user, the mobile terminal may start searching for the wireless signal sent by the device, to reduce energy consumption and reduce occupied system resources. For example, the mobile terminal provides an app or a system function interface. After detecting an operation of starting the application performed by the user on the display screen, a search trigger operation performed on the application after the application is started, or a search trigger operation performed by the user on the system function interface on the display screen, the mobile terminal starts the Wi-Fi apparatus 107 to search for the wireless signal.

The mobile terminal detects various operations performed by the user, including the search trigger network connection operation, a network connection confirm operation to be mentioned subsequently, and the like. The operations may be touch operations, detected by the mobile terminal, performed by the user on the touchscreen, or may be detected operations of the user such as gestures, voices, and limb movements. The mobile terminal obtains, by using the input device, an action performed or voice entered by the user, and sends the action or voice to the processor. The processor performs detection to determine whether the action performed or voice entered by the user meets a preset condition. If yes, the processor determines that the corresponding operation performed by the user is detected.

For example, smart glasses, serving as the terminal device, detect a gesture of the user by using a camera, and an internal processor detects the gesture to determine an operation action; or a terminal device having a voice control function collects a voice of the user by using the microphone 114, and an internal processor detects the voice to determine an operation instruction; or a motion sensor and an internal processor perform processing in a cooperation manner to determine a movement of the mobile terminal, and determine, according to the movement, an operation performed by the user, such as a "shake".

In some embodiments, when the mobile terminal detects the wireless signal sent by the electronic device 200, a display interface of the application or the system function interface displayed on the display screen displays information to indicate that the electronic device 200 is discovered.

After detecting the wireless signal, the mobile terminal may indicate to the user by displaying a notification. The notification (Notification) in all the embodiments of the present invention may be a term in an Android® open source operating system, and a technical person may create a notification according to a development guide for the notification of the system and display different types of notifications on the touchscreen, for example, a status bar notification, a floating notification, or a lock screen notification. The notification may alternatively be a notification in an iOS operating system.

The mobile terminal may further indicate device information of the electronic device 200, for example, a device type (for example, the device is a television, an air conditioner, a lamp, or the like), an initial name of the device before delivery, a serial number or an ID number (Identification) of the device before delivery, and vendor information of the device, based on the detected wireless signal, for the user to identify the electronic device 200.

In some embodiments, when the mobile terminal detects a plurality of electronic devices 200, the plurality of electronic devices 200 may be indicated simultaneously.

In step 103, the mobile terminal obtains a network connection confirm operation performed by a user, and provides a notification to the electronic device 200.

The mobile terminal displays an indication interface on the display interface, and obtains the network connection operation, that is, a network connection configuration operation, performed by the user according to the indication interface. Then, the mobile terminal provides the notification to the electronic device 200.

Then, in step 104 and step 105, after receiving the notification, the electronic device 200 decreases a signal transmit power; and at this time, the mobile terminal prompts the user to hold the mobile terminal and move closer to the electronic device 200, and indicates a detected signal strength of the electronic device 200 in real time.

In some embodiments, the electronic device 200 decreases the signal transmit power to be within a first threshold range, so that a transmitted signal is not detected by another mobile terminal or router when being outside a preset distance range or after being attenuated by an obstacle. For example, the first threshold range is −90 dBm to −110 dBm. Within this signal transmit power range, it can be ensured that another router and mobile phone cannot receive, after the signal is attenuated by a partition wall by 20 dB, the wireless signal sent by the electronic device 200.

The electronic device 200 uses a low power threshold, shielding connection and authentication of an unauthorized gateway. Only a mobile device of an authorized user has an opportunity to perform communication connection to the electronic device 200 at close range, and is not connected to a neighboring network of a same standard. Therefore, the method described in the present invention is suitable for large-scale network deployment.

In some embodiments, the mobile terminal 100 may prompt, on the display screen, the user to move closer to the electronic device 200; monitor in real time a movement status of the mobile terminal 100, the signal strength of the electronic device 200, or a combination thereof; and display, on the display interface, a movement direction (for example, moving closer to or away from the electronic device 200) of the mobile terminal 100 relative to the electronic device 200, the detected signal strength of the electronic device 200, information about a distance between the mobile terminal 100 and the electronic device 200, and the like based on the signal strength of the electronic device 200, the movement status of the mobile terminal 100, or the combination thereof. It should be understood that, in an actual product, any one or more pieces of the information may be selected for display. In addition, an indication manner may alternatively be a single sound indication or vibration indication, or any combination with a display manner of the display interface. Details are not described.

In some embodiments, the mobile terminal 100 may indicate the detected signal strength of the electronic device 200 by using a digit, an icon, or a character, for example, directly display a value or a character of the detected transmit signal power, or display a signal strength icon. When the mobile terminal 100 moves closer to or away from the electronic device 200, the signal strength detected by the mobile terminal 100 changes. The change, for example, a change in the value or an increase or a decrease in a quantity of signal bars on the icon, is directly displayed on the display interface of the mobile terminal 100, thereby prompting the user to hold the terminal device to move towards the electronic device 200.

Then, in step 106, when a preset condition is met in a process in which the mobile terminal 100 moves closer to the electronic device 200, the mobile terminal 100 sends a wireless network key to the electronic device 200. In some embodiments, the preset condition may be that a power intensity of a communication signal of each party of the mobile terminal 100 and the electronic device 200 exceeds a recognition threshold of the other party thereof. For example, a recognition threshold includes a range of the signal strength that is of the electronic device 200 and that is detected when the mobile terminal 100 moves within one meter from the electronic device 200.

In some embodiments, the mobile terminal 100 and the electronic device 200 perform key exchange. The electronic device 200 and the mobile device agree on, according to a standard-defined key exchange protocol, an ephemeral key for encrypted communication, further improving security. Then, the mobile terminal 100 sends the wireless network key to the electronic device 200 in an encrypted communication manner.

In some embodiments, a network key of one or more wireless networks may be stored in the mobile terminal 100. The mobile terminal 100 may display a list on the display interface, where the list includes information about at least one wireless network, obtain a select operation performed on the list by the user on the mobile terminal 100, and send a wireless network key corresponding to the select operation to the electronic device 200, further improving key transmission security.

In this step, the mobile terminal 100 may send the wireless network key to the electronic device 200, so as to ensure network connection security, without requiring the user to manually enter the wireless network key, thereby preventing the user from suffering a trouble of repeatedly searching for the wireless network key, and improving user experience.

In step 107, after receiving the wireless network key, the electronic device 200 increases the signal transmit power, and connects to a wireless network based on the wireless network key.

After receiving the wireless network key, the electronic device 200 restores to a STA working mode, restores the signal transmit power to a normal signal transmit power, and connects to the wireless network based on the wireless network key.

In some embodiments, if the electronic device 200 cannot connect to the network after receiving the wireless network key, a connection failure message may be fed back to the mobile terminal 100. The mobile terminal 100 indicates the connection failure message to the user, and rescinds the wireless network key to the electronic device 200 based on the user's operation, so that the electronic device 200 attempts to reconnect to the network, thereby increasing a connection success rate.

Then, the electronic device 200 may be connected to a cloud server to complete device registration and authentication. The registration and authentication process may be implemented with cooperation of the mobile terminal 100, and details are not described herein.

Figure 4:
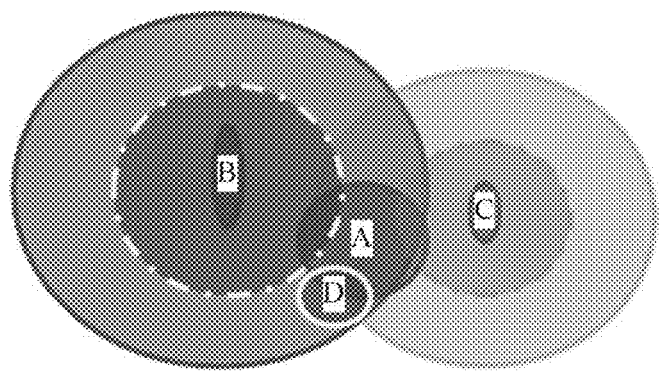
FIG. 4 is a schematic diagram of a scenario in which an electronic device is connected to a network according to an embodiment of the present invention.
Figure 5:
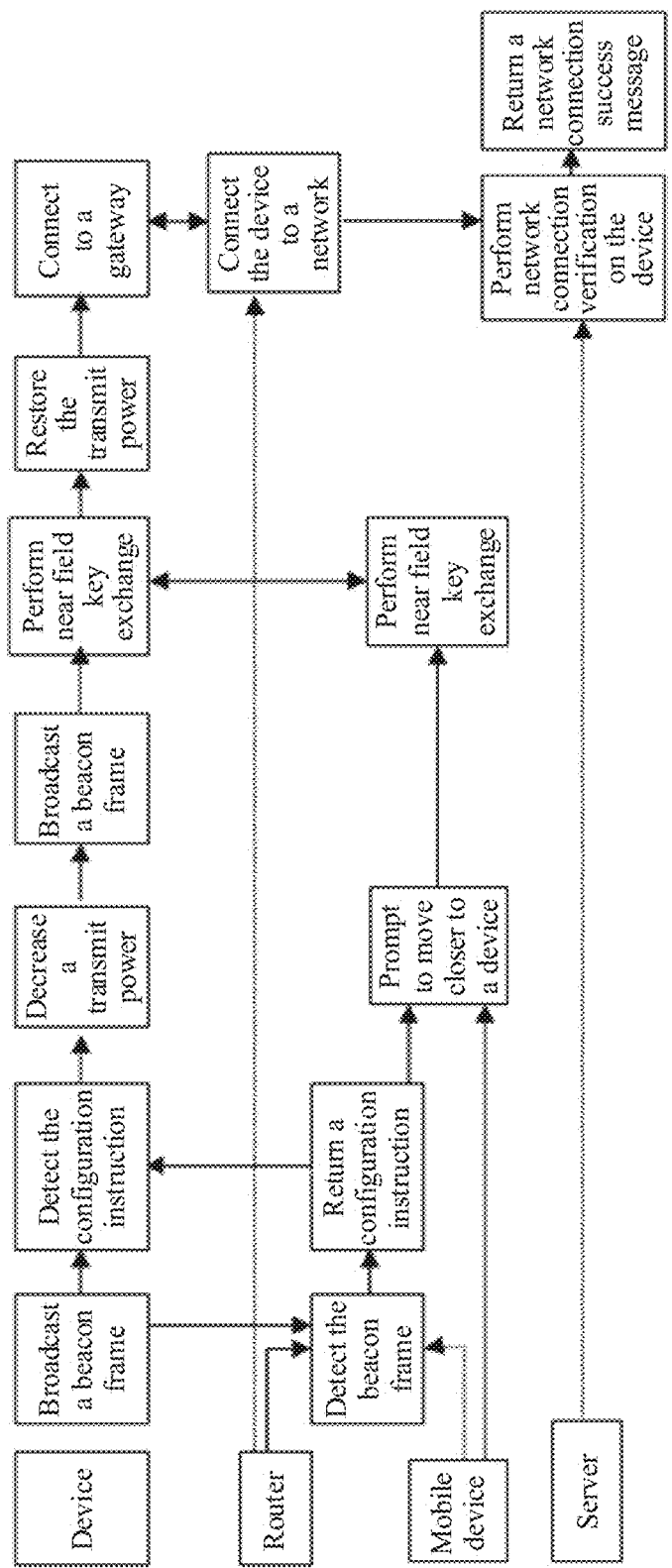
FIG. 5 is a schematic flowchart of a method for connecting an electronic device to a network with cooperation of a mobile terminal according to an embodiment of the present invention.

In the method, in the process in which the electronic device 200 performs network connection with the cooperation of the mobile terminal 100, after being discovered by the mobile terminal 100, the electronic device 200 decreases the transmit power, and performs key exchange after the mobile terminal 100 is close enough to the electronic device 200, preventing the device from being discovered and bound by a neighbor gateway supporting a same protocol as the electronic device 200. This method avoids a situation shown in FIG. 4 in which a device A that is located in an overlapping area of a gateway B and a gateway C and that is supposed to be connected to the gateway B is actually subject to a risk of being preemptively discovered and bound by the gateway C (an area circled by a dotted line is a range obtained after power limitation during authentication), thereby preventing a problem that an edge device may fail to connect to a gateway because the edge device is closer to a neighbor gateway. Still referring to FIG. 4, in this embodiment of the present invention, in this scenario, a mobile device D is used as a security agent, that is, as an authentication agent of the gateway B, a higher security threshold is set for the mobile device D, and a shorter authentication distance is required. The distance may be limited to be within one meter. Only when D moves closer to the device A, the gateway D can discover the device A to be connected to a network. There is an obstacle such as a wall between A and the gateway C, and after attenuation by the wall, a strength of a signal transmitted by A to the gateway C is far less than a strength of a signal that can be received by D. Based on the smart threshold design, the signal received by the gateway C is lower than a receiver sensitivity. This can effectively avoid interference from the neighbor gateway, and ensure automatic authentication and authorization and network connection of the device A.

FIG. 6 to FIG. 15 are schematic diagrams of scenarios provided in some embodiments of this application. With reference to FIG. 5 to FIG. 15, the following describes an initial network connection or network reconnection process of a smart hardware device in a specific scenario embodiment by using an example in which a smart TV 700 is used as the electronic device (namely, a device shown in FIG. 5) and a mobile phone 600 is used as a mobile terminal (namely, a mobile device shown in FIG. 5).

(A) In some embodiments, the mobile phone 600 in service may obtain information about a wireless network key in advance, and the mobile phone 600 records an account and a password of a used home Wi-Fi network.

(B) As shown in FIG. 6, after being powered on during initial installation or being restored to factory settings, or when required to perform network matching again, the smart TV 700 may enter a to-be-configured state, and a Wi-Fi apparatus on the smart TV 700 enters an AP working mode (access point working mode). The smart TV 700 broadcasts beacon information by using the Wi-Fi apparatus.

Step (A) and step (B) are performed by the mobile phone 600 and the smart TV 700, respectively.

Figure 7:
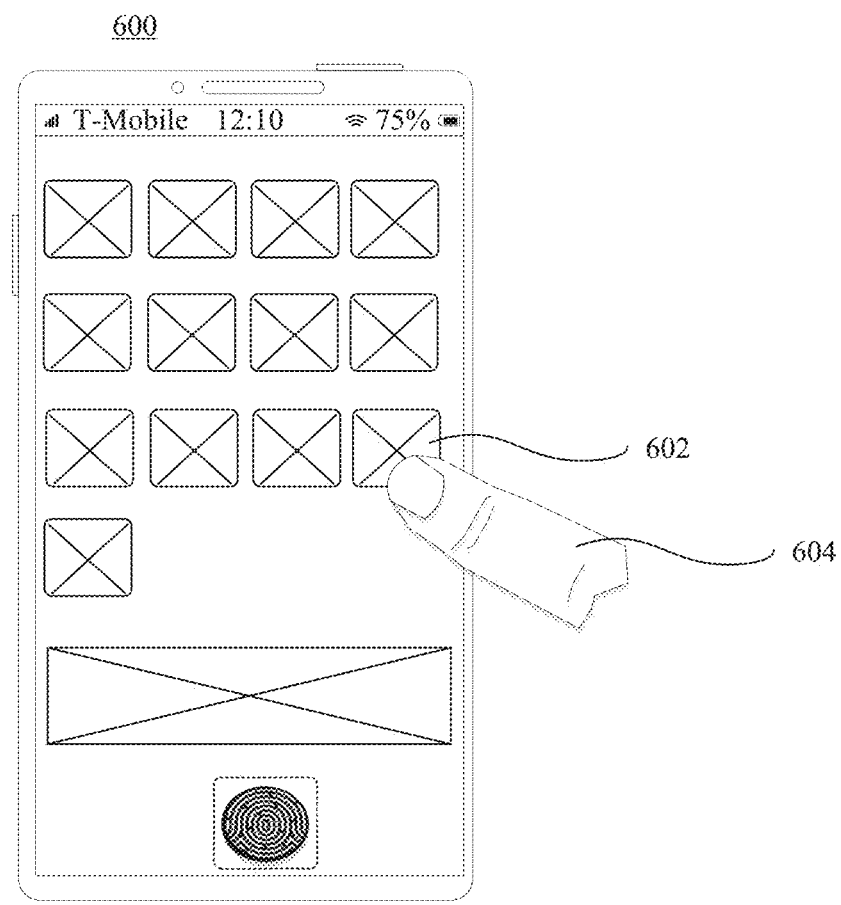

(C) Then, as shown in FIG. 7, after obtaining input of an operation of a user 604 on a specified application 602 on a touchscreen of the mobile phone 600, the mobile phone 600 starts the application, and displays an interface of the application.

Figure 8:

In some other embodiments, as shown in FIG. 8, the mobile phone 600 displays a Wi-Fi list according to input of an application setting operation of the user on the touchscreen of the mobile phone 600; after the mobile phone 600 finds a signal of the smartphone 700, the smartphone 700 is displayed in the Wi-Fi list; and after obtaining input of an operation of selecting the smart TV from the list by the user, the mobile phone 600 may directly display a working interface, or start a corresponding application and display an interface of the application.

Figure 9:
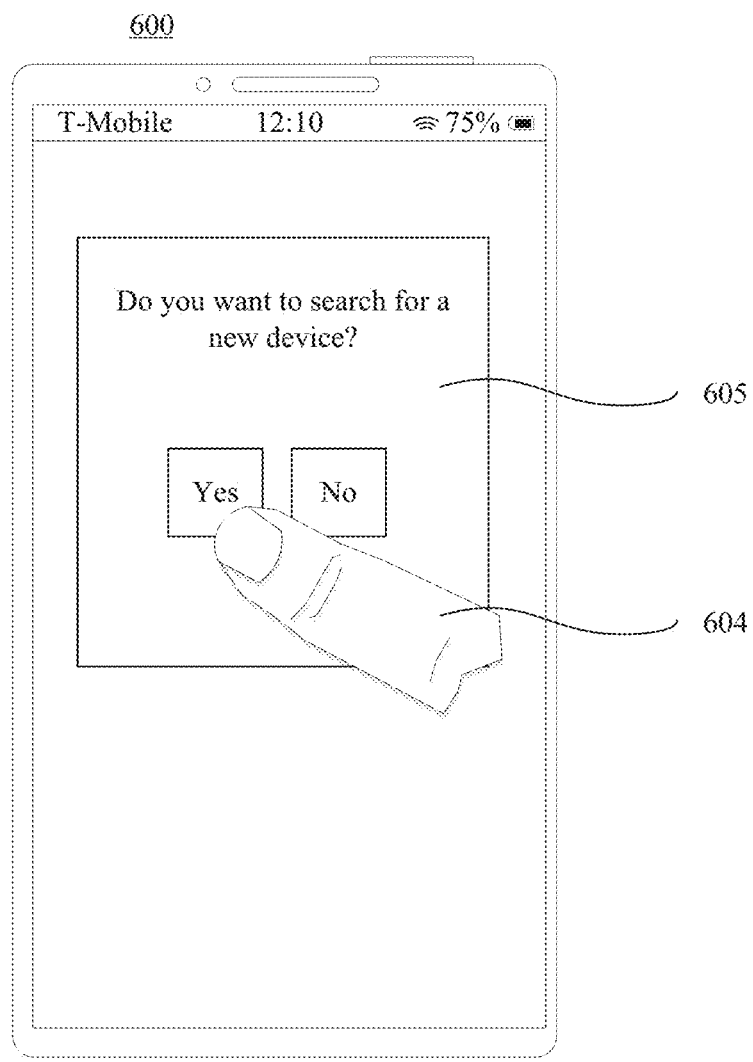
Figure 10:
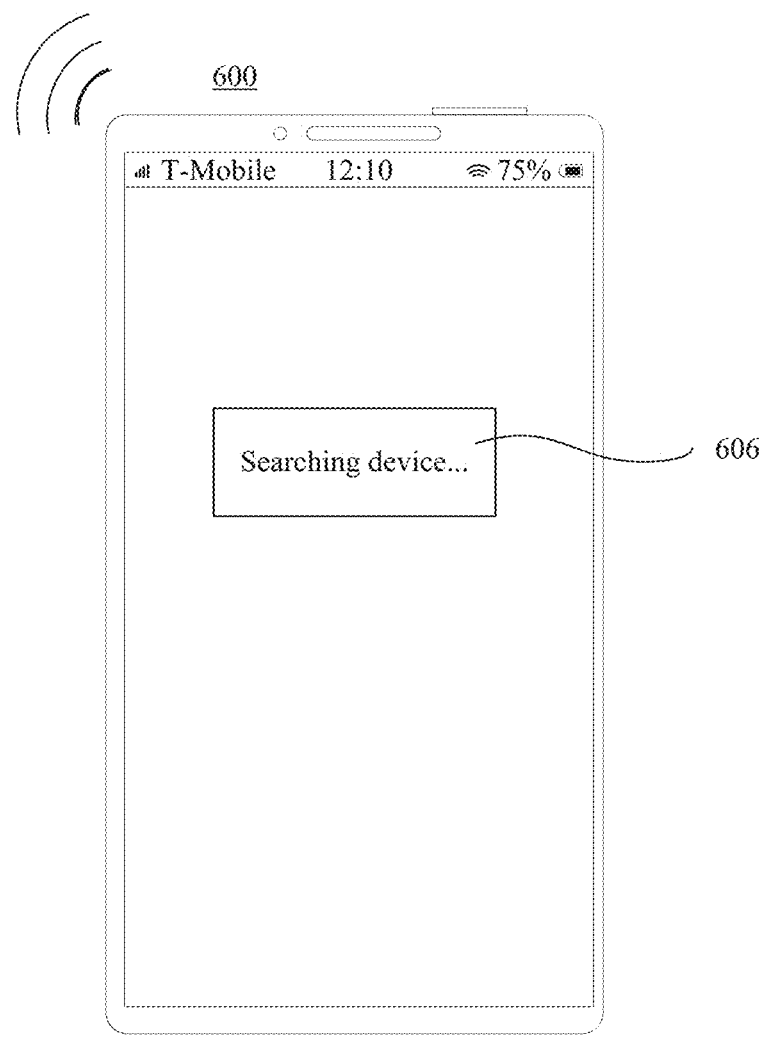
Figure 11:
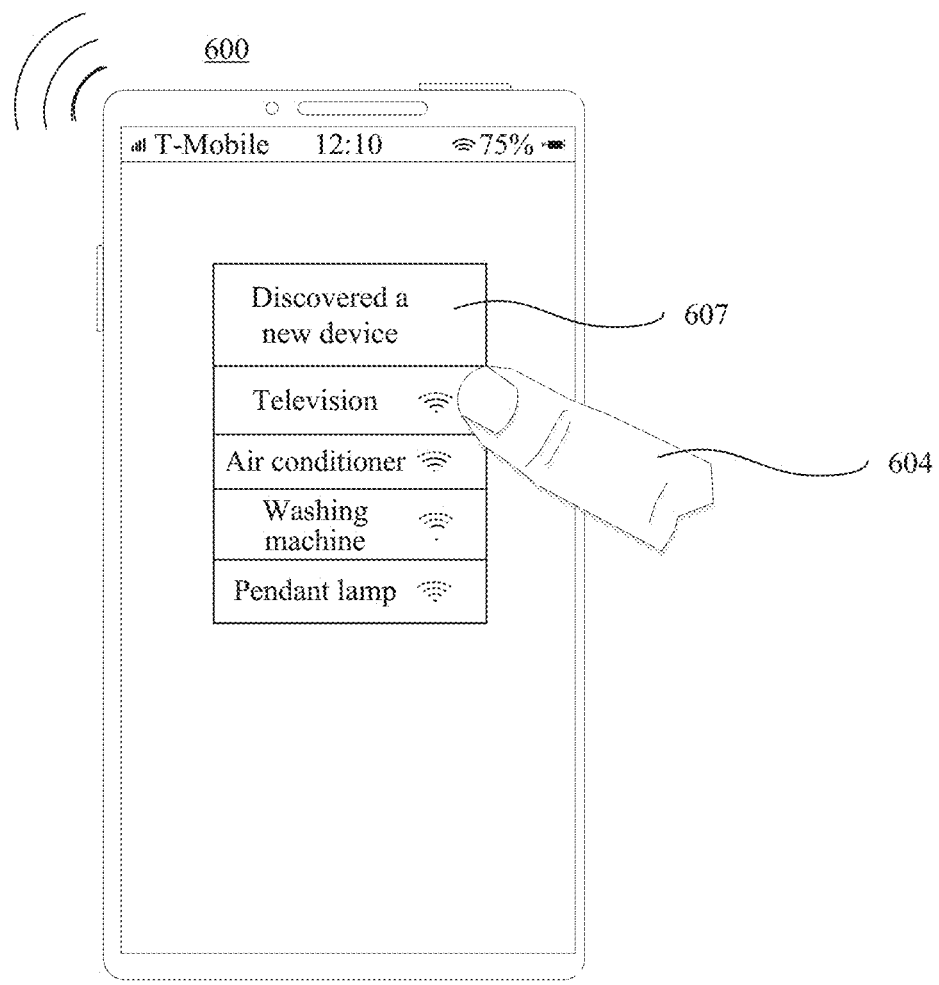

Then, as shown in FIG. 9, after displaying the working interface, the mobile phone 600 displays an indication interface 605 on the touch display screen, to ask the user whether to search for a new device. After obtaining an input operation, performed by the user 604 on the indication interface 605, for confirming to search for a new device, the mobile phone 600 starts to search for a new device. As shown in FIG. 10, the mobile phone 600 displays an indication interface 606, indicating to start searching for a new device. As shown in FIG. 11, when finding a new device, the mobile phone 600 displays an indication interface 607, indicating several discovered new devices. When obtaining input of a select operation of the user 604 on a specified device on the touch display screen, the mobile phone 600 determines a network connection configuration operation, and sends a configuration confirmation notification message to the smart TV 700.

(D) The smart TV 700 receives the configuration confirmation and dynamically decreases a power, for example, decreases the power to approximately −90 dBm to −110 dBm. This power intensity can ensure a basis that a signal cannot be received by another router and mobile phone after being attenuated by a partition wall by 20 dB, that is, a mobile phone of a neighbor on the other side of the partition wall cannot receive the signal, obtained after power reduction, of the smart TV 700.

Figure 12:
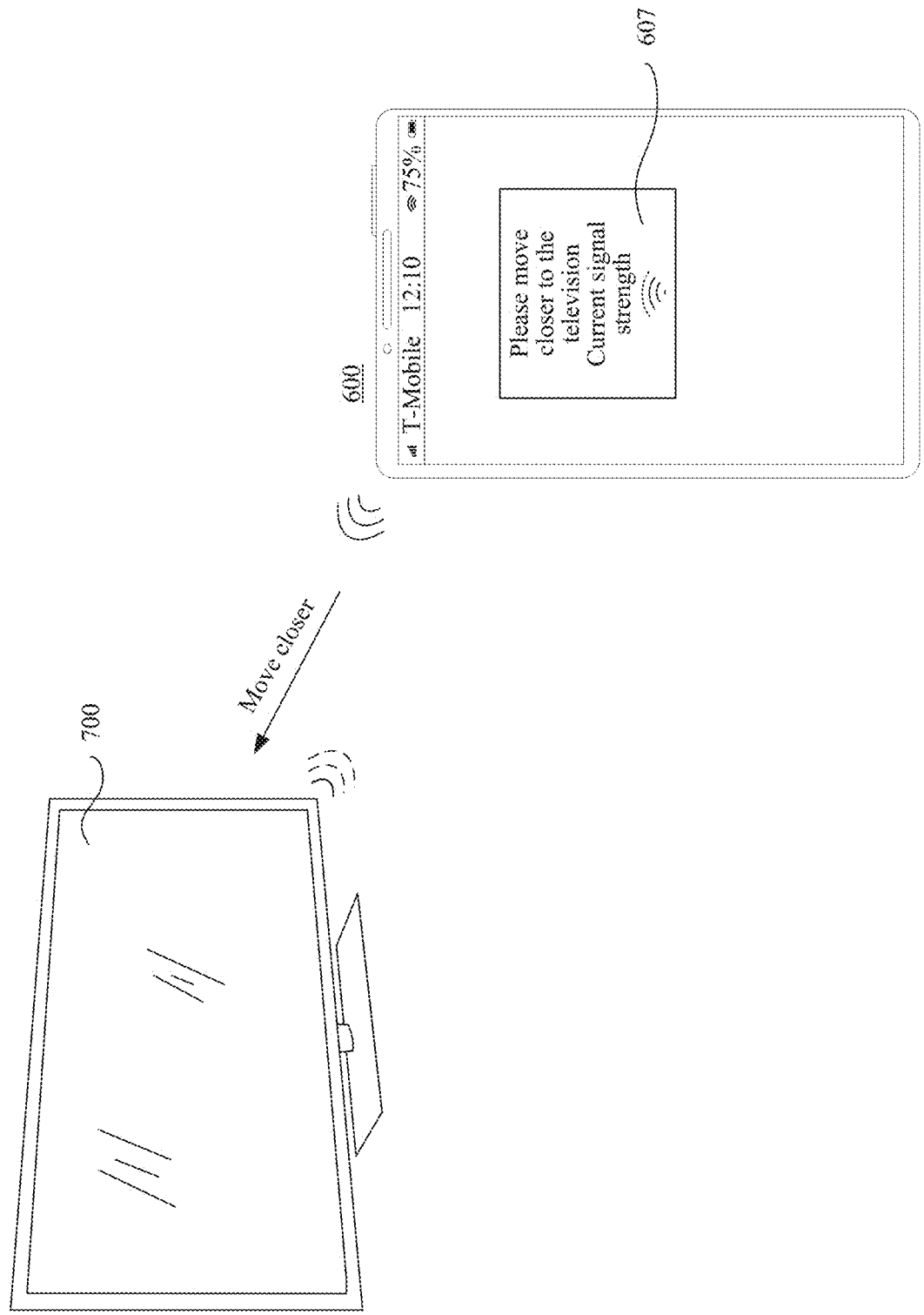

(E) As shown in FIG. 12, the mobile phone 600 displays an indication interface 608, prompting the user to move closer to the smart TV 700, and indicating a real-time signal strength. When the user holding the mobile phone 600 moves closer to the smart TV 700, the signal strength displayed on the indication interface 607 gradually increases.

Figure 13:
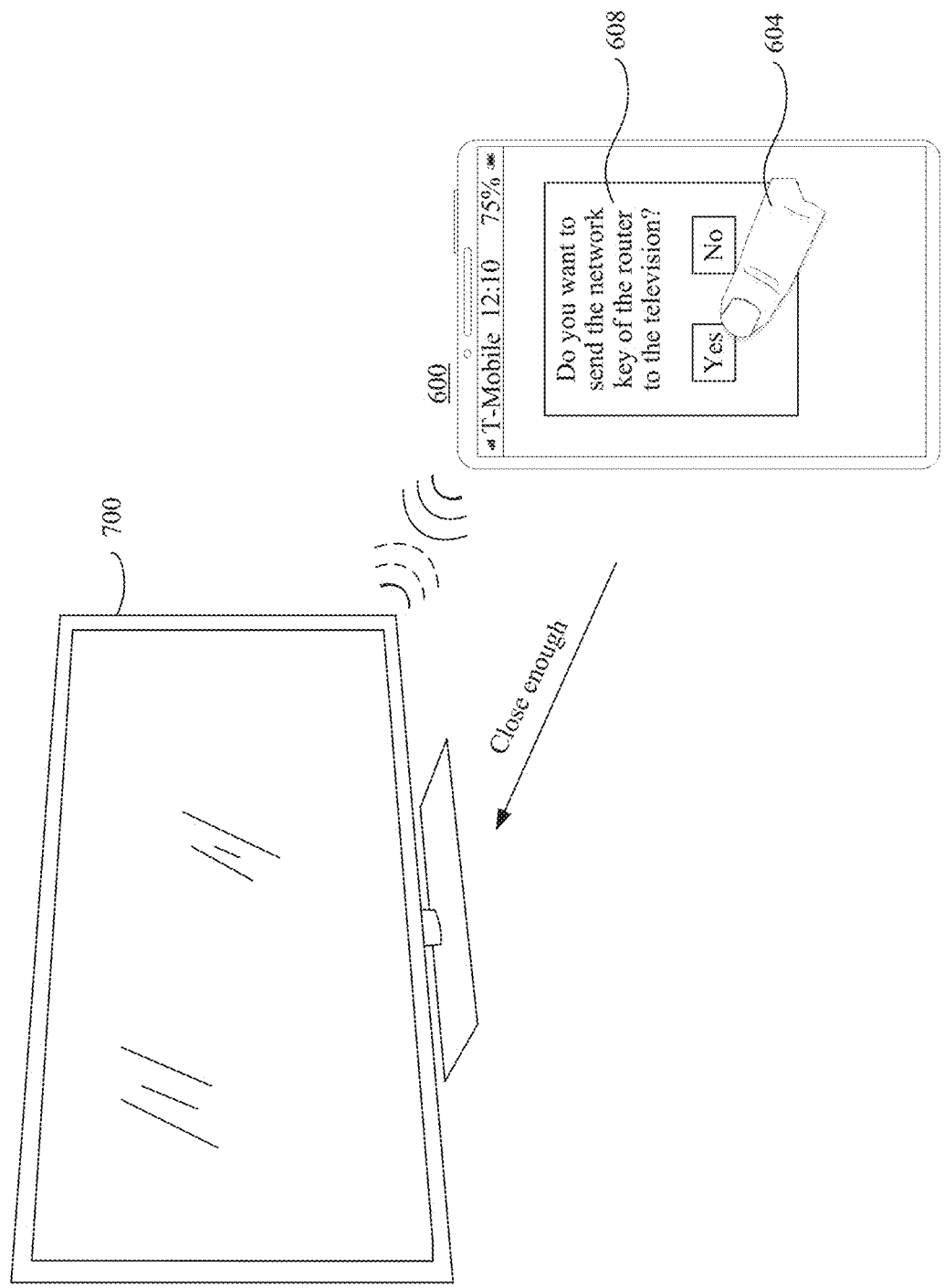
Figure 14:
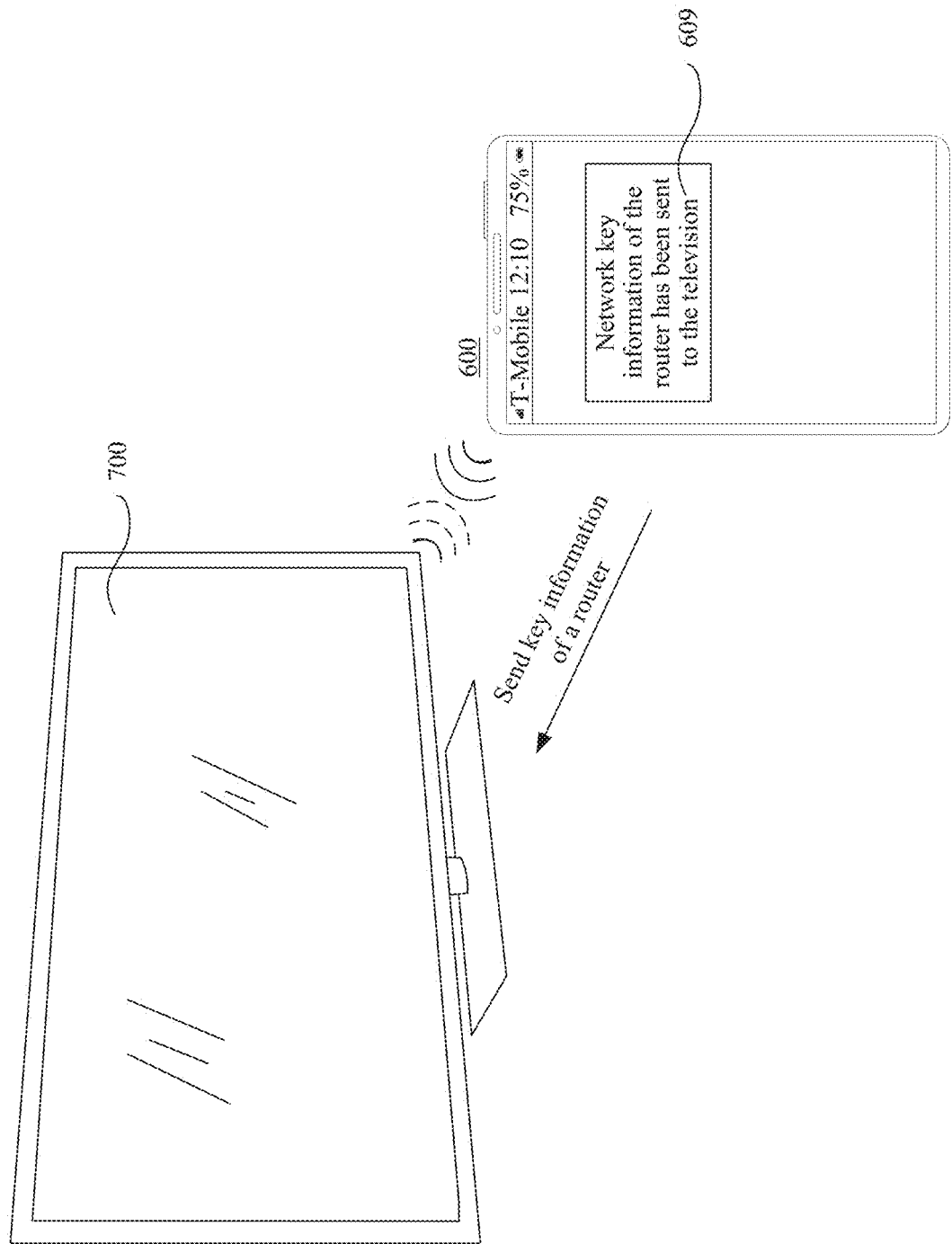

(F) As shown in FIG. 13 and FIG. 14, when the mobile phone 600 is close enough to the smart TV 700, a signal power intensity of each party of the mobile phone 600 and the smart TV 700 exceeds a recognition threshold of the other party thereof. The mobile phone 600 and the smart TV 700 perform key exchange, and the mobile phone 600 transmits the wireless network key recorded in step (A) to the smart TV 700.

In step (F), the mobile phone 600 may directly send the wireless network key to the smart TV 700, and display an indication interface 609, indicating that network key information of a router has been sent to the smart TV 700. In some other embodiments, before transmitting the wireless network key recorded in step (A) to the smart TV 700, the mobile phone 600 may display an interface 608 to prompt the user to choose whether to send the network key to the smart TV 700, or provide wireless network key information of a plurality of networks for the user to choose to send to the smart TV 700.

Figure 15:
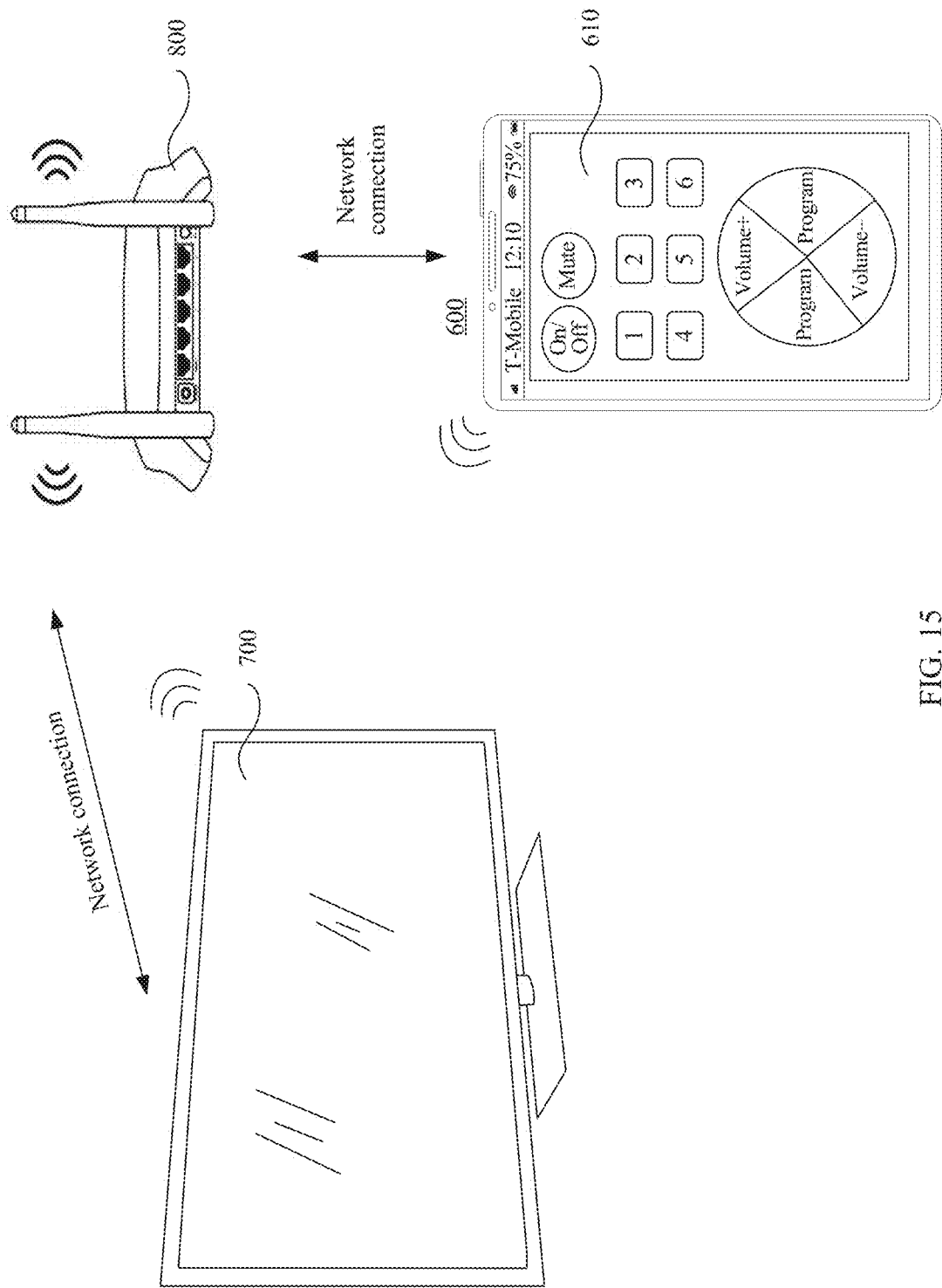

(G) Then, as shown in FIG. 15, after receiving the wireless network key, the smart TV 700 restores to a STA working mode (normal working mode), restores the transmit power to a normal transmit power, and connects to a wireless network of the router 800 based on the wireless key.

(H) Then, the smart TV 700 is connected to a cloud server by using the router 800, and the mobile phone 600 is connected to the cloud server by using the router 800 to cooperate with the smart TV 700 to complete registration and authentication of the smart TV. Thereafter, the mobile phone 600 can control the smart TV 700 by using the network. For example, the mobile phone 600 displays a control interface 610, such as a remote control interface, and the user may remotely control the smart TV 700 by using the mobile phone 600.

In conclusion, the newly used smart hardware device sends a beacon broadcast packet after being powered on; after receiving the beacon broadcast packet, the router and the mobile phone indicate to the user that the new smart hardware device is discovered and ask the user whether to configure network connection; the user triggers the router or a network connection key on the mobile phone to make the electronic device 200 enter a configuration mode; the electronic device 200 and the router exchange a password of the router and a key by using a key exchange algorithm, and the electronic device 200 enters the STA mode and connects to the network and the server based on the key of the router, to complete network connection configuration of the electronic device 200, without requiring the user to manually enter the key. This improves user experience and is suitable for large-scale network deployment.

In addition, this method avoids a prior-art security risk of interference from a neighboring network and a possible malicious attack or incorrect connection to the neighboring network. For example, an attacker uses an authorized electronic device to scan for and bind, in a community, a standard-compliant electronic device of a same type as the electronic device, and even if a transmit power is limited, a problem cannot be avoided that an edge smart hardware device in a user's home is incorrectly connected to a neighboring network of a same type as the wireless network because the edge smart hardware device is closer to the network.

Therefore, a mobile security agent technology resolves a security problem of automatic discovery of a wireless device in an application scenario such as smart home, and eliminates security problems of interference and malicious intrusion from a neighboring network. The mobile security agent reduces operation complexity, and overcomes a difficulty in quick device configuration during large-scale commercial promotion.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a digital versatile disc (DVD)), a semiconductor medium (for example, a Solid State Disk (SSD)), or the like.

In conclusion, the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method for connecting an electronic device to a wireless network, comprising:
    sending, from the electronic device to a mobile terminal, a wireless signal;
    detecting, by the mobile terminal, the wireless signal from the electronic device to indicate discovery of the electronic device;
    obtaining, by the mobile terminal, a network connection confirm operation performed on the mobile terminal;
    providing, by the mobile terminal, in response to the network confirm operation, a notification to the electronic device;
    receiving, by the electronic device from the mobile terminal, the notification;
    decreasing, by the electronic device, a signal transmit power after receiving the notification;
    prompting, by the mobile terminal, a user to decrease the distance between the mobile terminal and the electronic device;
    indicating, by the mobile terminal, a detected signal strength of the electronic device in real time;
    sending, by the mobile terminal to the electronic device, a wireless network key when both a preset condition is met and the distance between the mobile terminal and the electronic device decreases;
    increasing, by the electronic device, in response to receiving the wireless network key, the signal transmit power; and
    connecting the electronic device to the wireless network, based on the wireless network key.

2. The method of claim 1, wherein decreasing, by the electronic device, a signal transmit power further comprises decreasing the signal transmit power to within a first threshold range, such that a transmitted signal is not detectable by another mobile terminal or a router, either outside of a preset distance range, or when the transmitted signal is attenuated by an obstacle.

3. The method of claim 1, wherein before sending, by the mobile terminal, the wireless network key to the electronic device, the method further comprises:
    performing, by the electronic device, a key exchange with the mobile terminal to assign an ephemeral key for encrypted communication; and
    sending, by the mobile terminal, the wireless network key to the electronic device based on encrypted communication using the ephemeral key.

4. An electronic device comprising:
    a processor; and
    a memory coupled to the processor and storing instructions that, when executed by the processor, cause the electronic device to be configured to:
        send a wireless signal;
        receive, in response to the wireless signal, a notification from a mobile terminal affirming accessibility of a wireless network;
        decrease signal transmit power based on the notification;

receive a prompt to decrease the distance between the electronic device and the mobile terminal;

indicate at least one of a detected signal strength of the electronic device and a distance between the electronic device and the mobile terminal;

receive a wireless network key from the mobile terminal when both a preset condition is met and the distance between the electronic device and the mobile terminal decreases; and connect to the wireless network based on the wireless network key.

5. The electronic device of claim 4, wherein the instructions further cause the electronic device to search for the wireless signal in response to a search trigger operation performed by a user.

6. The electronic device of claim 4, wherein the instructions cause the electronic device to indicate on a display interface that the electronic device is discovered when receiving the notification from the mobile terminal.

7. The electronic device of claim 6, wherein the instructions further cause the electronic device to indicate at least one of, a network type, a network name, or a network ID.

8. The electronic device of claim 4, wherein the instructions further cause the electronic device to increase the signal transmit power in response to receiving the wireless network key.

9. The electronic device of claim 4, wherein the instructions further cause the electronic device to display the detected signal strength on a display interface in real time.

10. The electronic device of claim 9, wherein the instructions further cause the electronic device to display a digit, an icon, or a character indicating the detected signal strength.

11. The electronic device of claim 4, wherein when a preset condition is met, before sending a wireless network key to the electronic device, the processor causes the electronic device to:

perform_key exchange with the mobile terminal to select an ephemeral key for encrypted communication; and receive the wireless network key from the mobile terminal based on encrypted communication using the ephemeral key.

12. The electronic device of claim 4, wherein the instructions further cause the electronic device to:

display a list on a display interface when the preset condition is met and the distance between the electronic device and the mobile terminal decreases, wherein the list comprises information about at least one wireless network;

obtain a select operation performed on the list by a user; and send the wireless network key corresponding to the select operation to the electronic device.

13. The electronic device of claim 4, wherein the instructions further cause the electronic device to:

receive a notification that the electronic device is connected to the wireless network after sending the wireless network key to the electronic device; and indicate that the electronic device is connected to the wireless network.

14. An electronic device comprising:

a processor; and a memory coupled to the processor and storing instructions that, when executed by the processor, cause the electronic device to be configured to:

send a wireless signal;

decrease a signal transmit power after receiving a notification that a mobile terminal has obtained a wireless network connection confirm operation;

receive a wireless network key from the mobile terminal when a preset condition is met and a decrease is detected in the distance between the mobile terminal and the electronic device;

increase the signal transmit power after receiving the wireless network key; and connect to a wireless network based on the wireless network key.

15. The electronic device of claim 14, wherein the instructions further cause the electronic device to broadcast a beacon frame.

16. The electronic device of claim 14, wherein the instructions cause the electronic device to decrease the signal transmit power to within a first threshold range such that a transmitted signal is not detectable by another mobile terminal or a router, either outside of a preset distance range, or when the transmitted signal is attenuated by an obstacle.

17. The electronic device of claim 16, wherein the first threshold range is −90 decibel-milliwatts (dBm) to −110 dBm.

18. The electronic device of claim 14, wherein before receiving a wireless network key from the mobile terminal when the preset condition is met and the distance between the mobile terminal and the electronic device is detected to decrease, the instructions further cause the electronic device to:

perform key exchange with the mobile terminal to assign an ephemeral key for encrypted communication; and receive the wireless network key from the mobile terminal using the ephemeral key.

19. The electronic device of claim 14, wherein after the instructions cause the electronic device to connect to the wireless network, the instructions further cause the electronic device provide a notification to the mobile terminal.

20. The electronic device of claim 14, wherein after the instructions cause the electronic device to connect to the wireless network, the instructions further cause the electronic device to complete online registration and authentication of the electronic device using the wireless network.

* * * * *

UNITED STATES PATENT AND TRADEMARK OFFICE
CERTIFICATE OF CORRECTION

PATENT NO. : 11,470,058 B2
APPLICATION NO. : 16/490830
DATED : October 11, 2022
INVENTOR(S) : Fei Wu et al.

It is certified that error appears in the above-identified patent and that said Letters Patent is hereby corrected as shown below:

In the Claims

Claim 11, Column 23, Line 38: "perform¬_key" should read "perform¬ key"

Signed and Sealed this
Twentieth Day of December, 2022

Katherine Kelly Vidal
*Director of the United States Patent and Trademark Office*